US012648657B2

(12) United States Patent　　　　(10) Patent No.:　US 12,648,657 B2
Mansour　　　　　　　　　　　　　　(45) Date of Patent:　　Jun. 9, 2026

(54) VERTICAL CIGAR DISPLAY

(71) Applicant: Remon Mansour, El Cajon, CA (US)

(72) Inventor: Remon Mansour, El Cajon, CA (US)

( * ) Notice: Subject to any disclaimer, the term of this patent is extended or adjusted under 35 U.S.C. 154(b) by 0 days.

(21) Appl. No.: 18/428,466

(22) Filed: Jan. 31, 2024

(65) Prior Publication Data

US 2024/0245234 A1　　Jul. 25, 2024

Related U.S. Application Data

(63) Continuation of application No. 17/570,330, filed on Jan. 6, 2022, now Pat. No. 11,910,940, which is a continuation-in-part of application No. 16/721,028, filed on Dec. 19, 2019, now Pat. No. 11,234,461.

(51) Int. Cl.
| | |
|---|---|
| *A47F 7/00* | (2006.01) |
| *A24F 15/20* | (2006.01) |
| *A24F 25/02* | (2006.01) |
| *A47F 3/00* | (2006.01) |
| *A47F 3/06* | (2006.01) |
| *A47F 3/14* | (2006.01) |
| *G06Q 10/087* | (2023.01) |

(52) U.S. Cl.
CPC ............ *A47F 7/0028* (2013.01); *A24F 15/20* (2013.01); *A24F 25/02* (2013.01); *A47F 3/001* (2013.01); *A47F 3/063* (2013.01); *A47F 3/14* (2013.01); *G06Q 10/087* (2013.01)

(58) Field of Classification Search
CPC ......... A24F 15/20; A24F 25/02; A47F 1/126; A47F 3/001; A47F 3/063; A47F 3/14; A47F 7/0028

USPC ............... 211/13.1, 59.3, 60.1, 70.3, 126.15; 131/329, 303
See application file for complete search history.

(56) References Cited

U.S. PATENT DOCUMENTS

| | | |
|---|---|---|
| 804,487 A | 11/1905 | Macarthy |
| 950,689 A | 3/1910 | Deeming |
| 1,016,492 A | 2/1912 | Gunn |
| 1,216,031 A | 2/1917 | Wilcox |
| 1,587,936 A * | 6/1926 | Brunhoff ................. A47F 1/126 312/126 |
| 1,678,260 A | 7/1928 | Martino et al. |
| 1,683,851 A | 9/1928 | Wells |
| 1,712,024 A | 5/1929 | Brogden |
| 1,841,267 A | 1/1932 | Koch |
| 1,843,514 A | 2/1932 | Levy |
| 1,913,921 A | 6/1933 | Eastwood |
| 1,954,013 A | 4/1934 | Lilienfield |
| 2,050,140 A | 8/1936 | Ward |

(Continued)

OTHER PUBLICATIONS

Acryl China Co. Ltd. "Clear acrylic e-cigarette display racks stands/acrylic display stand/e-cigars holders." http://www.acrylchina. com/acrylic-display-stand/electronic-prodcts-display/clear-acrylic-e-cigarette-display-racks.html (downloaded Jul. 12, 2019).

*Primary Examiner* — Jonathan Liu
(74) *Attorney, Agent, or Firm* — LOZA & LOZA, LLP; Kevin L. Soules

(57) ABSTRACT

A method, system, and apparatus for displaying tobacco products comprises an enclosure and at least one product tray inside the enclosure, the product tray comprising a base, a frame formed around the base, and a series of display bars disposed in the frame, the display bars including a series of product stand holes for displaying the tobacco products individually and vertically.

13 Claims, 29 Drawing Sheets

(56) References Cited

U.S. PATENT DOCUMENTS

| | | | |
|---|---|---|---|
| 2,058,800 A | 10/1936 | Jasper | |
| 2,401,161 A | 5/1946 | Joel | |
| 2,427,218 A | 9/1947 | Liebson | |
| 2,506,191 A | 5/1950 | Bayuk | |
| 2,568,089 A | 9/1951 | Pendleton | |
| 2,611,491 A | 9/1952 | Lewis | |
| 2,639,958 A * | 5/1953 | Stephenson | A47F 3/001 |
| | | | 312/31 |
| 2,681,262 A | 6/1954 | Vincent | |
| 2,781,918 A | 2/1957 | Palm, Jr. | |
| 2,818,979 A | 1/1958 | Rose | |
| 3,145,841 A | 8/1964 | Mcguire | |
| 3,259,748 A | 7/1966 | Lammers | |
| 3,300,055 A | 1/1967 | Rohr | |
| 3,306,689 A | 2/1967 | Isaacson et al. | |
| 3,351,210 A | 11/1967 | Murcott | |
| 3,357,597 A | 12/1967 | Groff | |
| 3,452,899 A * | 7/1969 | Libberton | A47F 1/126 |
| | | | 221/242 |
| 3,583,556 A | 6/1971 | Wagner | |
| 3,716,284 A | 2/1973 | Vogt | |
| 3,774,774 A | 11/1973 | Menkel | |
| 3,846,004 A | 11/1974 | Relyea | |
| 3,942,852 A | 3/1976 | Anthony | |
| 3,970,199 A | 7/1976 | Marshak | |
| 4,019,793 A | 4/1977 | Gerding | |
| 4,518,208 A | 5/1985 | Marder | |
| 4,538,736 A | 9/1985 | Berger | |
| 4,660,719 A | 4/1987 | Peterson et al. | |
| 4,947,984 A | 8/1990 | Kaufman et al. | |
| 5,222,610 A | 6/1993 | Johansen et al. | |
| 5,496,103 A | 3/1996 | Kozak | |
| 5,651,262 A | 7/1997 | Pendergast | |
| 5,794,771 A | 8/1998 | Krawec et al. | |
| 5,848,534 A | 12/1998 | Stauffer | |
| 5,850,839 A | 12/1998 | Adami | |
| 5,878,882 A | 3/1999 | Kohagura | |
| D410,108 S | 5/1999 | Reed | |
| 5,905,653 A | 5/1999 | Higham et al. | |
| 5,970,987 A | 10/1999 | Barreiro, Jr. | |
| 5,971,205 A * | 10/1999 | Michaels | G07F 11/16 |
| | | | 221/241 |
| 6,006,903 A | 12/1999 | Milone | |
| 6,047,701 A | 4/2000 | Feldman | |
| D435,143 S | 12/2000 | Post, Jr. | |
| 6,168,030 B1 | 1/2001 | Morris | |
| 6,283,291 B1 | 9/2001 | Vasudeva et al. | |
| 6,283,566 B1 | 9/2001 | Doces | |
| 6,536,609 B2 * | 3/2003 | Lake | A47F 1/126 |
| | | | 211/74 |
| RE38,905 E | 12/2005 | Wei | |
| 7,063,219 B2 * | 6/2006 | Fann | A47B 96/025 |
| | | | 211/74 |
| 7,175,034 B2 | 2/2007 | Nook et al. | |
| D577,513 S | 9/2008 | Walker et al. | |
| 8,448,646 B2 | 5/2013 | Cooper | |
| 9,642,475 B2 * | 5/2017 | Vogler | A47F 5/0846 |
| 10,182,670 B2 | 1/2019 | Pretotto | |
| 10,238,142 B1 * | 3/2019 | Haddad | A24F 15/005 |
| 11,234,461 B2 * | 2/2022 | Mansour | A47F 7/0028 |
| 11,547,221 B1 * | 1/2023 | Elsherif | G06K 7/1417 |
| 11,910,940 B2 * | 2/2024 | Mansour | G06Q 10/087 |
| 2003/0041868 A1 | 3/2003 | Deloach | |
| 2007/0062891 A1 | 3/2007 | Stievenard | |
| 2007/0163973 A1 | 7/2007 | Smokowicz et al. | |
| 2009/0050167 A1 | 2/2009 | Wood | |
| 2009/0224875 A1 | 9/2009 | Rabinowitz et al. | |
| 2010/0072150 A1 | 3/2010 | Takashima et al. | |
| 2010/0328037 A1 | 12/2010 | Thomas et al. | |
| 2013/0118941 A1 | 5/2013 | Wells | |
| 2013/0146552 A1 * | 6/2013 | Grimes | A47B 88/48 |
| | | | 211/126.15 |
| 2015/0185068 A1 | 7/2015 | Anderson et al. | |
| 2016/0007744 A1 | 1/2016 | Fasino et al. | |
| 2016/0364640 A1 | 12/2016 | Dachniwskyj et al. | |
| 2020/0037661 A1 | 2/2020 | Slate et al. | |
| 2020/0109001 A1 * | 4/2020 | Howard | A24F 15/00 |
| 2021/0195946 A1 | 7/2021 | Slate et al. | |
| 2022/0160147 A1 | 5/2022 | Mansour | |
| 2024/0245234 A1 * | 7/2024 | Mansour | A24F 25/02 |

* cited by examiner

110

210  225

205

216

215

217

220

205  210  217

220

216

240  230 250 255  235  245

VERTICAL CIGAR DISPLAY

CROSS REFERENCE TO RELATED PATENT APPLICATIONS

This patent application is a continuation of U.S. nonprovisional patent application Ser. No. 17/570,330 titled "VERTICAL CIGAR DISPLAY," filed Jan. 6, 2022. U.S. patent application Ser. No. 17/570,330 is herein incorporated by reference in its entirety. U.S. patent application Ser. No. 17/570,330, is a continuation in part of U.S. nonprovisional patent application Ser. No. 16/721,028 titled "VERTICAL CIGAR DISPLAY," filed Dec. 19, 2019. U.S. patent application Ser. No. 16/721,028 is herein incorporated by reference in its entirety.

TECHNICAL FIELD

Embodiments are generally related to product displays. Embodiments are further related to cigar displays. Embodiments are also related to humidors with integrated displays. Embodiments are additionally related to a systems and methods for displaying cigars in a humidor.

BACKGROUND

A humidor is a container configured to store tobacco products including cigars, cigarettes or pipe tobacco. A humidor is configured to control and maintain the humidity in the container to prevent negative effects on the products inside, which might result from too much or too little humidity. Humidors are configured with systems that store and release humidity. In most cases the preferred humidity level for a humidor is between 68%-75%.

Those in the business of cigar sales generally store cigars in wooden boxes. The boxes can be shelved in a humidor so that the box lids can remain open. This allows customers to browse the selection of cigars and select those they would like to purchase.

While this version of storage is acceptable it also has various downsides. First, cigar boxes tend to obfuscate the cigar rings on the products making it difficult to identify the cigar. In addition, the customer usually touches more than one of the cigars, which can serve as a vector for the spread of disease. Such displays often lack the aesthetics to encourage a customer to purchase a cigar.

Furthermore, traditional cigar boxes can hold differing numbers of cigars. When a consumer is browsing the products, it is very difficult for the store owner to monitor how many cigars have been removed from a box. Keeping track of how many cigars have been taken from a box is a challenge. Inventory monitoring is thus, a major challenge presented by standard cigar display systems.

Accordingly, there is a need in the art for improved methods, systems, and apparatuses for displaying tobacco products, as disclosed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for displaying products.

It is another aspect of the disclosed embodiments to provide a system and apparatus for displaying tobacco products individually and vertically in a grid.

It is another aspect of the disclosed embodiments to provide a humidor configured with a series of product display shelves formed therein, the product display shelves being configured to display tobacco products.

The aforementioned aspects and other objectives and advantages can now be achieved as described herein. In one embodiment, a system and/or apparatus for displaying tobacco products comprises an enclosure and at least one product tray inside the enclosure, the product tray comprising a base, a frame formed around the base, and a series of display bars disposed in the frame, the display bars including a series of product stand holes for displaying the tobacco products individually and vertically. The individual and vertical arrangement of tobacco products allows a store owner to easily monitor which cigars have been selected by consumers, and allows the store owner to track inventory.

In an embodiment, a product display system comprises a base, a frame formed around the base, and at least one display bar configured to sit on the base and inside the frame formed around the base, the display bar further comprising at least one tubular channel, the tubular channel being configured to hold a product for display.

In an embodiment, the at least one tubular channel comprises a plurality of tubular channels formed in a row on each of the plurality of display bars. In an embodiment the depth of each of the plurality of tubular channels decreases sequentially from the front tubular channel to the back tubular channel among the plurality of tubular channels. The at least one tubular channel can be configured to have a diameter sized to fit a tobacco product.

In an embodiment, the system includes a plurality of display bars, wherein the base and the frame are sized to house the plurality of display bars. The plurality of display bars are arranged in the frame formed around the base such that the plurality of tubular channels form a grid of tubular channels. The base further comprises a plurality of slats.

In another embodiment, the system includes a humidor wherein the base, the frame formed around the base, and the at least one display bar are housed in the humidor. In this case, the frame can further comprise a first side rail, the first side rail having a first connecting arm mounted thereon, the first connecting arm configured to interface with a first mounting rail mounted in the humidor; and a second side rail, the second side rail having a second connecting arm mounted thereon, the second connecting arm configured to interface with a second mounting rail mounted in the humidor.

In another embodiment, a product display system comprises a humidor, and an extendable display tray mounted in the humidor, the extendable display tray further comprising: a base, a frame formed around the base, and a plurality of display bars arranged inside the frame formed around the base, each of the plurality of display bars comprising a row of tubular channels, each of the tubular channels being configured to hold a cigar vertically. The system can include a first connecting arm mounted to a side of the frame, the first connecting arm configured to interface with a first mounting rail mounted in the humidor, and a second connecting arm mounted to an opposing side of the frame, the second connecting arm configured to interface with a second mounting rail mounted in the humidor. In an embodiment, the depth of each of the plurality of tubular channels decreases sequentially from a front tubular channel among the plurality of tubular channels to a back tubular channel among the plurality of tubular channels. In an embodiment, the base, the frame formed around the base, and the plurality of display bars arranged inside the frame formed around the base are made of wood. In an embodiment, the diameter of the tubular channels in each of the mounting blocks is different.

In another embodiment, a product display system comprises an enclosure and at least one product tray inside the enclosure, the product tray comprising: a base, a frame formed around the base, and at least one top sheet extending between two edges of the frame, the at least one top sheet having at least one product stand hole formed therein. The enclosure can be transparent. In an embodiment, a humidifier can be disposed in the enclosure. In an embodiment, the system can include a plurality of top sheets each of the plurality of top sheets extending between the two edges of the frame. In an embodiment, the enclosure can include at least two shelves formed inside the enclosure, wherein each of the at least two shelves houses one of the at least one product trays.

BRIEF DESCRIPTION OF THE DRAWINGS

The accompanying figures, in which like reference numerals refer to identical or functionally-similar elements throughout the separate views and which are incorporated in, and form a part of, the specification, further illustrate the embodiments and, together with the detailed description, serve to explain the embodiments disclosed herein.

DETAILED DESCRIPTION

Figure 1A:
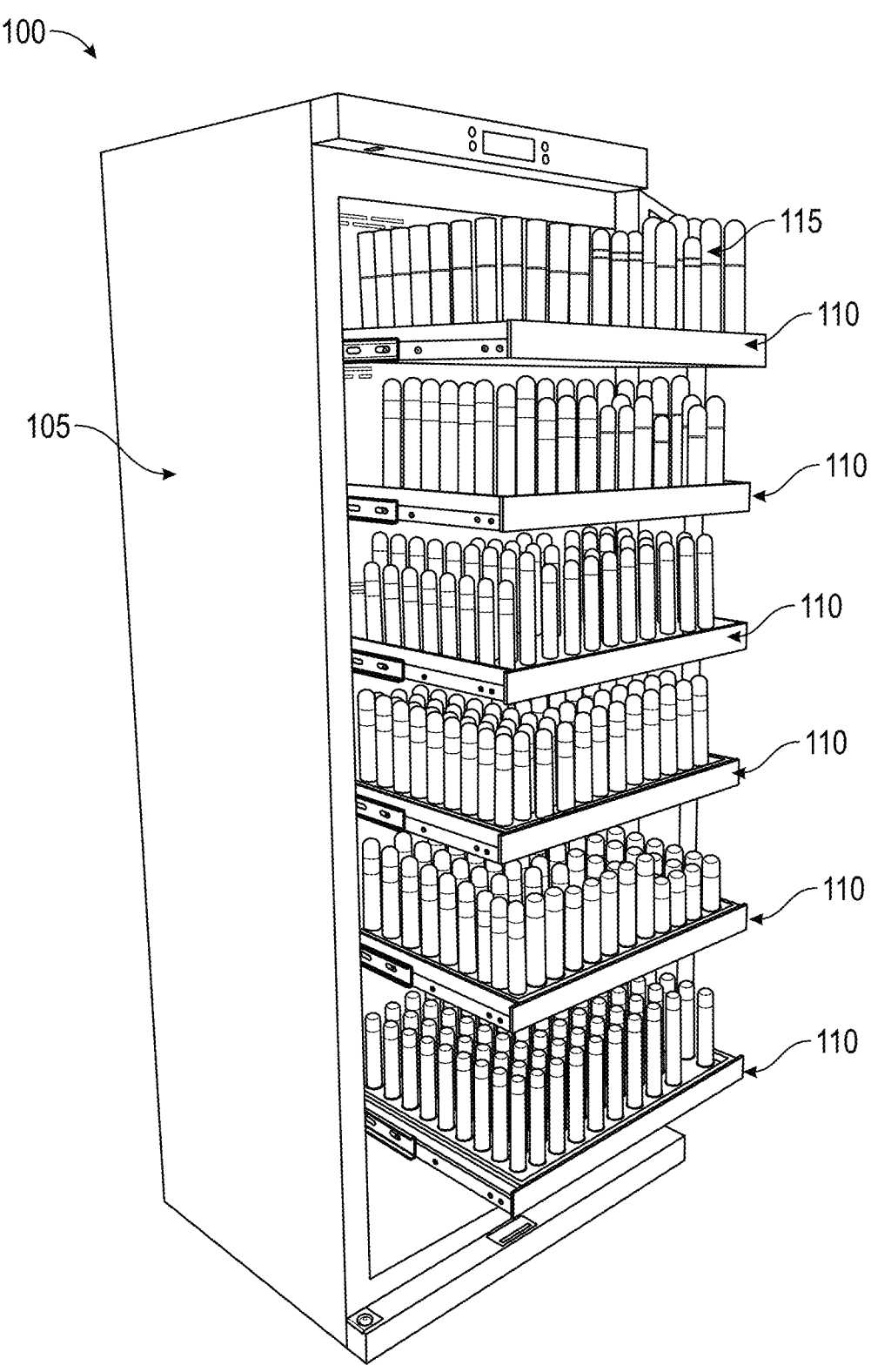
FIG. 1A depicts a product display system, in accordance with the disclosed embodiments.

The particular values and configurations discussed in the following non-limiting examples can be varied, and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. In addition, the term "based on" may be understood as not necessarily intended to convey an exclusive set of factors and may, instead, allow for existence of additional factors not necessarily expressly described, again, depending at least in part on context.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments disclosed herein are drawn to methods, systems, and apparatuses for displaying products, and in particular for systems and methods to vertically display cigars, cigarettes, and other tobacco products in a humidor.

The systems disclosed herein can include a tray comprising a product tray with a grid of cigar sized holes. The product tray can be used to hold a selection of tobacco products vertically. The system further includes an associated apparatus for mounting one or more of the trays in a humidor, so that the tobacco products can be individually and vertically displayed in the humidor.

FIG. 1A illustrates a product display system 100. The product display system 100 generally comprises a humidor 105, and a series of extendable display trays 110, for displaying products 115. As illustrated in FIG. 1A, the series of extendable display trays 110 can be organized in the humidor 105, at various vertical locations in the humidor 105. The extendable display trays 110, can be configured to display individual products, which can be cigars, cigarettes, or other such tobacco products, vertically, so that a consumer can peruse and select a product for purchase.

Figure 1B:
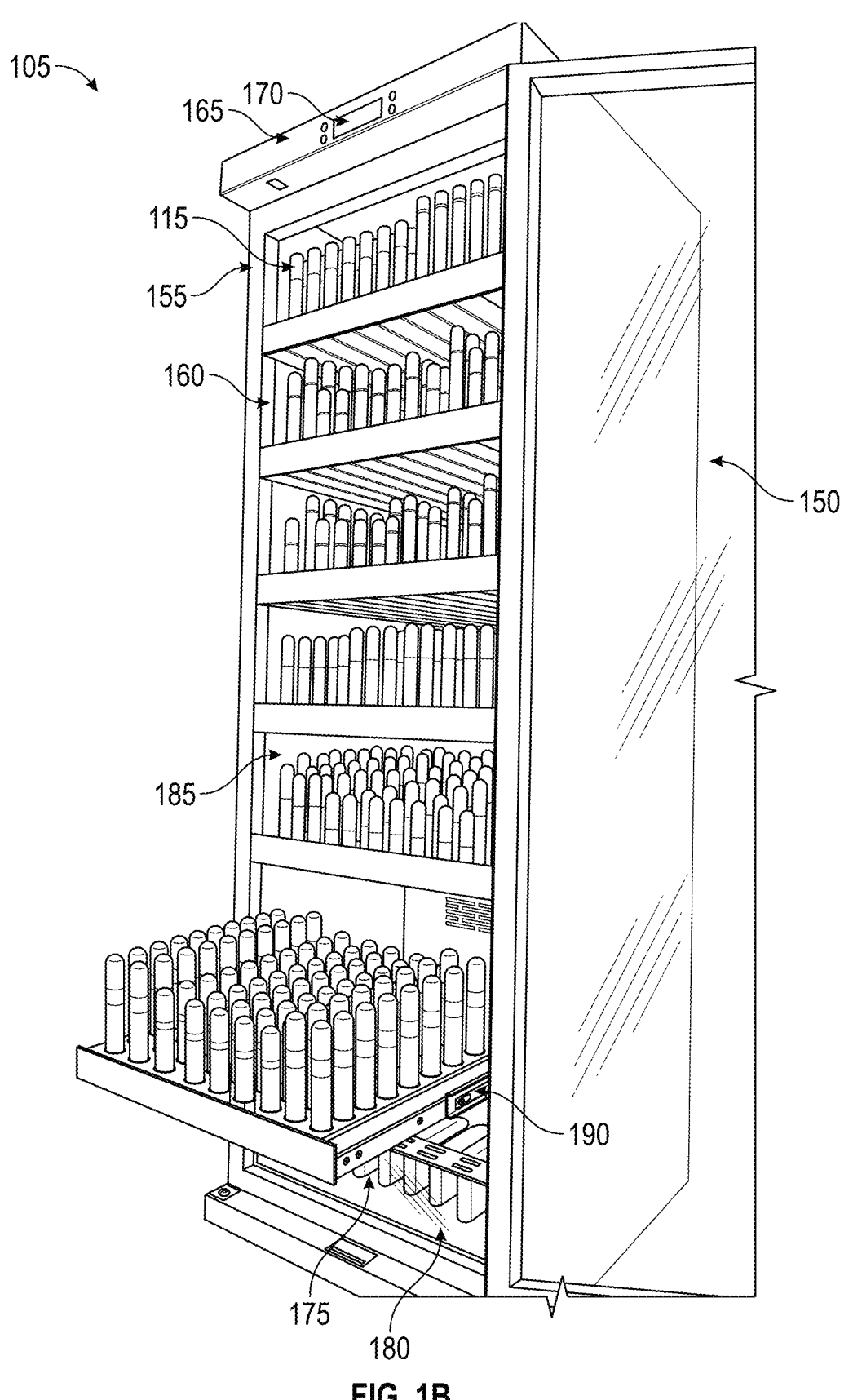
FIG. 1B depicts another view of a product display system, in accordance with the disclosed embodiments.

The humidor 105 is further illustrated in FIG. 1B. As illustrated the humidor 105 can generally comprise an enclosure 150. The enclosure 150 can include a transparent door on its front side 155. The humidor 105 can thus be enclosed and sealed. The ability to seal the interior of the humidor from external conditions is important to maintain the tobacco products at the desired temperature and humidity. The humidor 105 includes various units that require electric power, and can therefore include a power cord for connecting to a power source or a battery.

The humidor 105 can include lights 160 that can run along the internally facing sides of the walls of the humidor. The lights 160 illuminate the tobacco products 115 displayed in the humidor 105.

The humidor 105 can further include a temperature and humidity control module 165 which can be used to set the interior environment of the humidor to a desired temperature and humidity level. The temperature and humidity control module can include a display 170 illustrating the current temperature and humidity level in the humidor 105. The humidor can include a temperature control mechanism which can be embodied as a heat pump, compressor, or other such temperature control component. The humidor can also have a humidifier 175 configured on the interior floor 180 of the humidor 105. The humidor serves to maintain the internal humidity level inside the enclosure 150.

The interior walls 185 of the humidor 105, can be configured with mounting rails 190. The mounting rails 190 are configured to interface with connecting arms formed on the display trays 110. For each display tray 110, two mounting rails 190 can be mounted at substantially the same vertical position on opposing interior walls 185 of the humidor 105. The connecting arms formed on sides of the display tray 110, can engage the mounting rails 190 to hold the display tray 110 in place. The arrangement allows the display tray 110 to be pulled from the interior of the enclosure into an extended position, so that a product can be selected and removed from the display tray 110, and then pushed back into its closed position in the humidor 105. In FIG. 1B, one display tray 110 is illustrated in an extended position (pulled out from the humidor 105), while the remaining display trays 110 remain in their closed position.

Figure 1C:
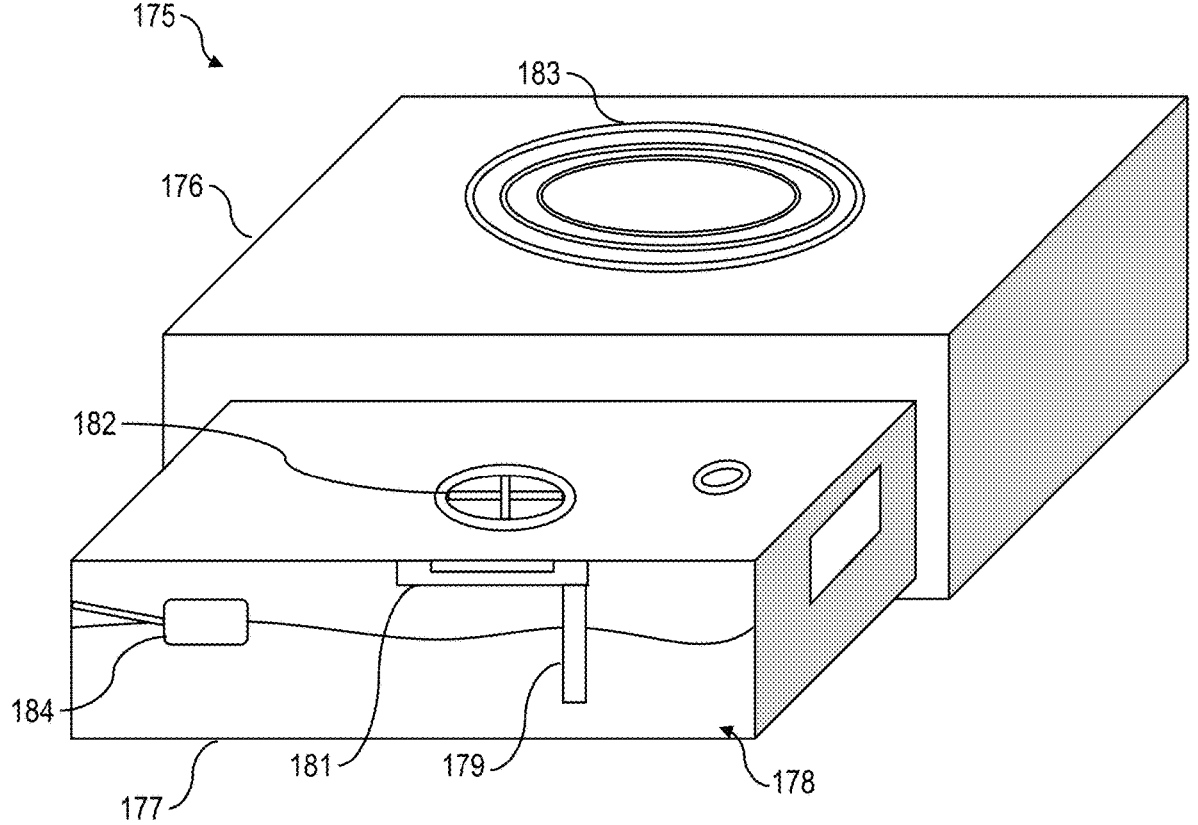
FIG. 1C depicts aspects of a humidifier, in accordance with the disclosed embodiments.

FIG. 1C illustrates aspects of a humidifier 175 in accordance with the disclosed embodiments. The humidifier 1C can include a humidifier housing 176 and a fluid containing tray 177. The fluid containing tray 177 can comprise an insert that can be inserted or removed from the humidifier housing to ease the task of refilling the fluid containing tray with mixture 178 of water and a cleaning formula. The humidifier 175 can further include a pump 179 used to draw mixture 178 to a moisture pad 181. The moisture pad 181 can be located proximate to a fan 182 which blow the humidified liquid through aperture 183, into the humidifier 105. The humidifier 175 can further include a float 184 connected to a sensor. The float 184 is used to monitor the mixture 178 level in the fluid containing tray 177.

Figure 2A:
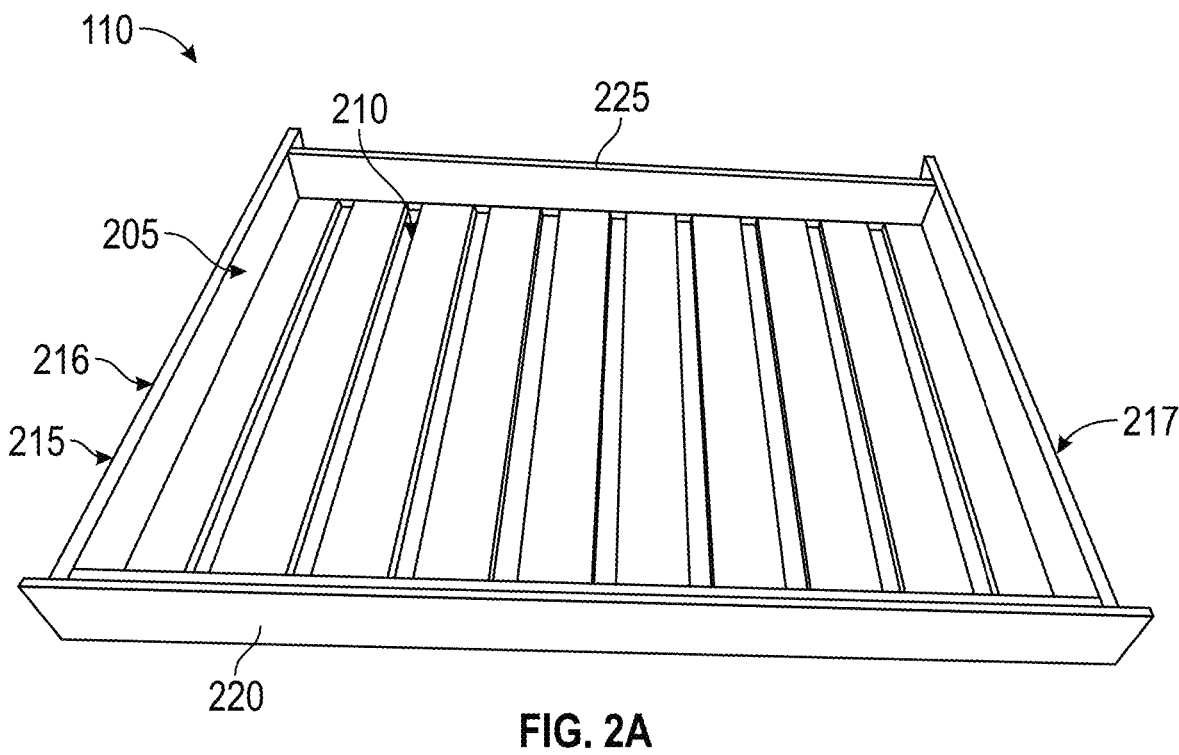
FIG. 2A depicts aspects of an extendable display tray in accordance with the disclosed embodiments.

Aspects of an extendable display tray 110 are illustrated in FIG. 2A. The extendable display tray 110 can comprise a base 205. In some embodiments, the base 205 can comprise a series of slats 210. The slats 210 are configured to allow loose tobacco particles to filter out of the base 205 for easy collection. In other embodiments, the base 205 can be a single piece.

The base 205 is enclosed by a frame 215. The frame 215 includes two side rails, side rail 216 and side rail 217. The front 220 of the extendable display tray 110 can be connected to the side rail 216 and side rail 217. The rear 225 of the frame 215 is also connected to the side rail 216 and side rail 217. The base 205 and frame 215 thus form an open-topped tray.

Figure 2B:
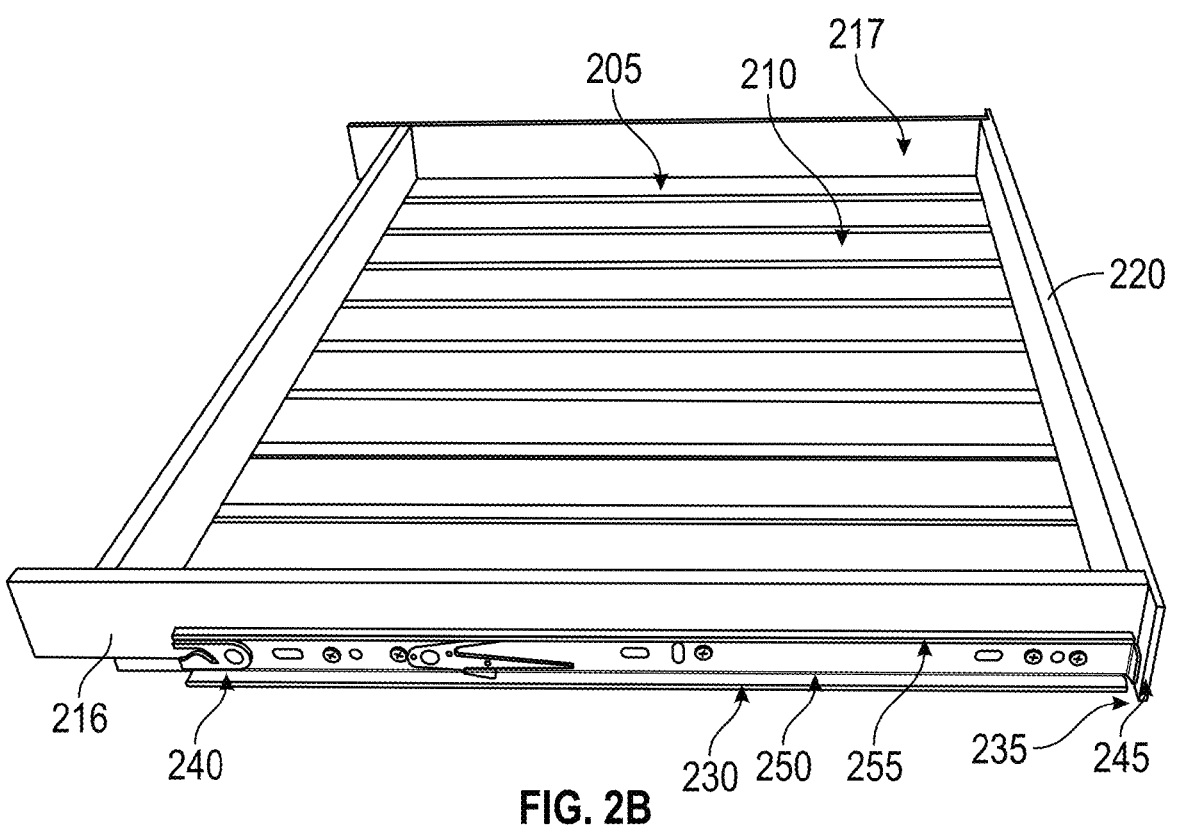
FIG. 2B depicts a side view of an extendable display tray in accordance with the disclosed embodiments.

FIG. 2B illustrates a side perspective of the extendable display tray 110. From this perspective, a connecting arm 230 can be seen installed on side rail 216. It should be appreciated that the side rail 217 can similarly have a connecting arm 230 mounted thereon, although the connecting arm is not visible on side rail 217 from the perspective illustrated in FIG. 2B.

The connecting arm 230 can include an end stop 240 at one end, and a mounting tab 235 on the other end. The mounting tab 235 comprises a tab that can be connected to an end 245 of the front 220 of the display tray 110. The connecting arm 230 can include an upper rib 250 and a lower rib 255. The ribs are configured to house a roller mounted on an internal side of a wall of the humidor (or other such enclosure), such that the roller or slide that can facilitate movement of the connecting arm 230 when it is engaged to the mounting rail 190, between the upper rib 250 and lower rib 255. The end stop 240 can prevent the extendable display tray 110 from being pulled out of its extended position in the humidor 105, or other enclosure.

Figures 3A, 3B:
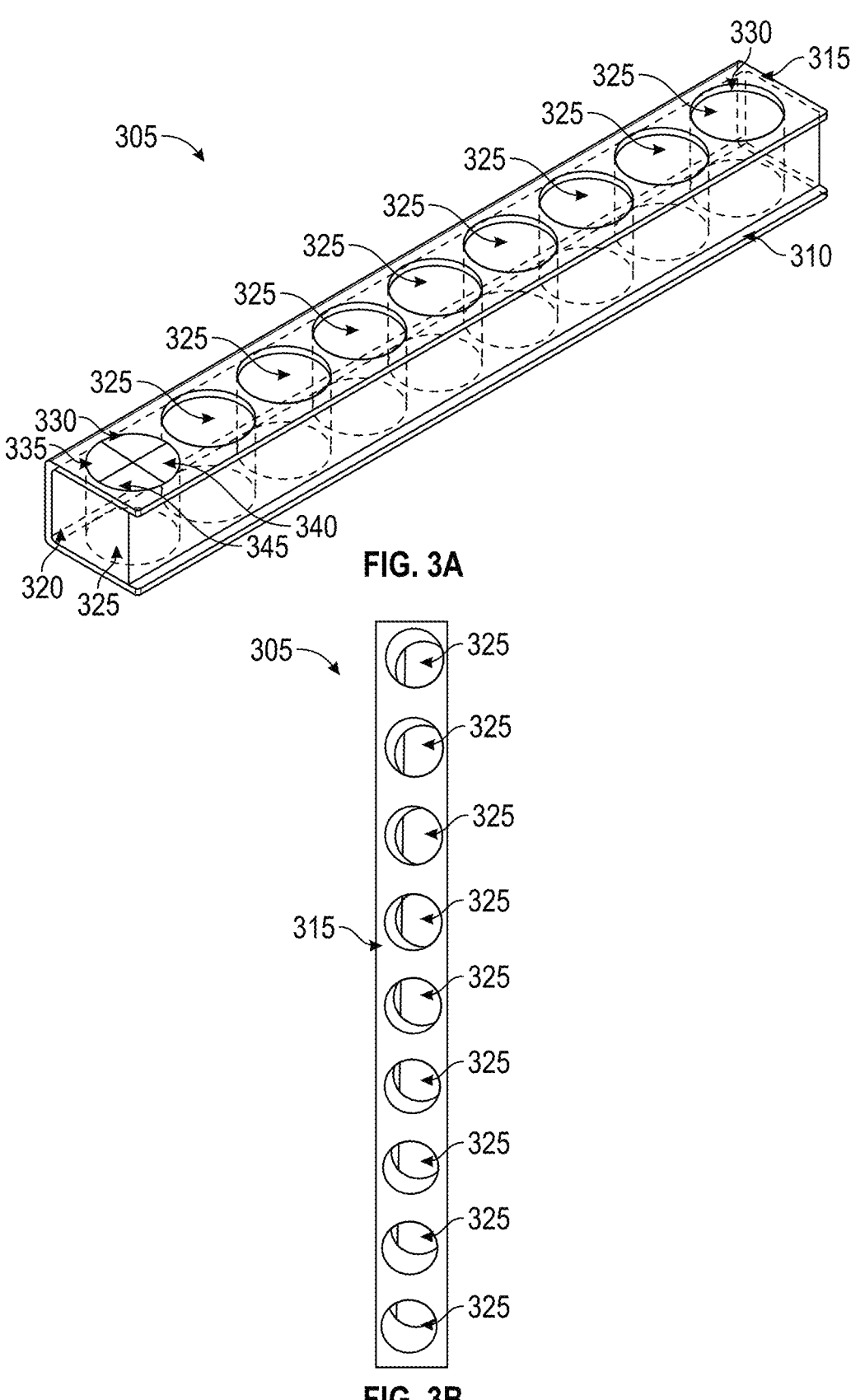
FIG. 3A depicts aspects of a display bar, in accordance with the disclosed embodiments.
FIG. 3B depicts a top view of a display bar, in accordance with the disclosed embodiments.

The extendable display tray 110 can further include a plurality of display bars 305. One such display bar 305 is illustrated in FIG. 3A. The display bar 305 can comprise a bottom stop 310 and a top layer 315. The bottom stop 310 and top layer 315 bookend a product block 320. The product block 320 can comprise a structure through which a series of one or more tubular channels 325 are formed. The top layer 315 can include a series of openings (e.g. opening 330) that align with the tubular channels 325 formed in the product block 320.

Each of the openings 330, and the tubular channels 325, are configured to allow a tobacco product to stand upright in the display bar 305. In certain embodiments, the tobacco product can comprise a cigar, cigarette, or other such product. The circumference of the openings 330 and/or the tubular channels 325 can therefore be sized to fit such products. In some cases, each of the display bars 305 can have a row of tubular channels 325 where each of the tubular channels 325 has a different diameter so that different sized tobacco products will fit in each display bar 305. In other embodiments, each of the tubular channels 325 in a given display bar 305 can have the same diameter. In still other embodiments, each of the tubular channels 325 in a given display bar can have the same diameter but each respective display bar 305 can have a set of tubular channels 325 with a diameter that differs from the diameter of the tubular channels 325 in the other display bars 305. This allows the system to accommodate products of various diameters.

In certain embodiments, the depth of each of the plurality of tubular channels 325 can decrease sequentially from the front tubular channel 325 to the back tubular channel 325 among the plurality of tubular channels 325. In this way, the products displayed in the front tubular channel 325 will be slightly lower than the product behind it, so that all of the products are visible. In certain embodiments, the depth of the tubular channels 325 can further be selected to create more complex patterns or designs in the respective heights of the products 115 displayed therein.

In other embodiments, the shape of the tubular channels can be selected to ensure that the product stands in a substantially vertical "standing" position in the display bar 305. Thus, in certain embodiments, the tubular channels 325 can be conically shaped such that the end of the tubular channel 325 nearer to the bottom stop 310 has a narrower diameter, than at the opposing end, nearer to the top layer 315. In this way, the tubular channels 325 can each hold tobacco products irrespective of the diameter of the product (assuming that the diameter of the product is smaller than the diameter of the top of the tubular channel.

Similarly, in certain embodiments, a cover 335 can be formed on one or more of the openings 330. The cover 335 can comprise a rim 345 and a series of flaps 340. The flaps can be formed of a material that is flexible. The flaps 340 can allow a tobacco product to be inserted into the opening 330. The flex in the flaps can serve to hold the tobacco product 115 in its place vertically in the tubular channels 325.

In certain embodiments, the bottom stop 310 can comprise a base plate that can be slid into and out of position on the bottom of the display bar 305. The base plate can be held in position in a slot formed in the bottom side of the product block 320. This embodiment allows the bottom stop 310 to be removed so that residual tobacco material that has fallen in the tubular channels 325 can be removed and the tubular channel 325 can be cleaned, by removing the base plate, emptying the residual product, and then replacing the base plate onto the bottom of the product block 320, in place in the slot formed in the product block 320. In other embodiments, the bottom stop 310 can be removed entirely from the display bar 305.

FIG. 3B illustrates a top plan view of the display bar 305. From this view it is possible to see the base plate partially removed from the bottom of the display bar 305, below the tubular channels 325.

Figure 4A:
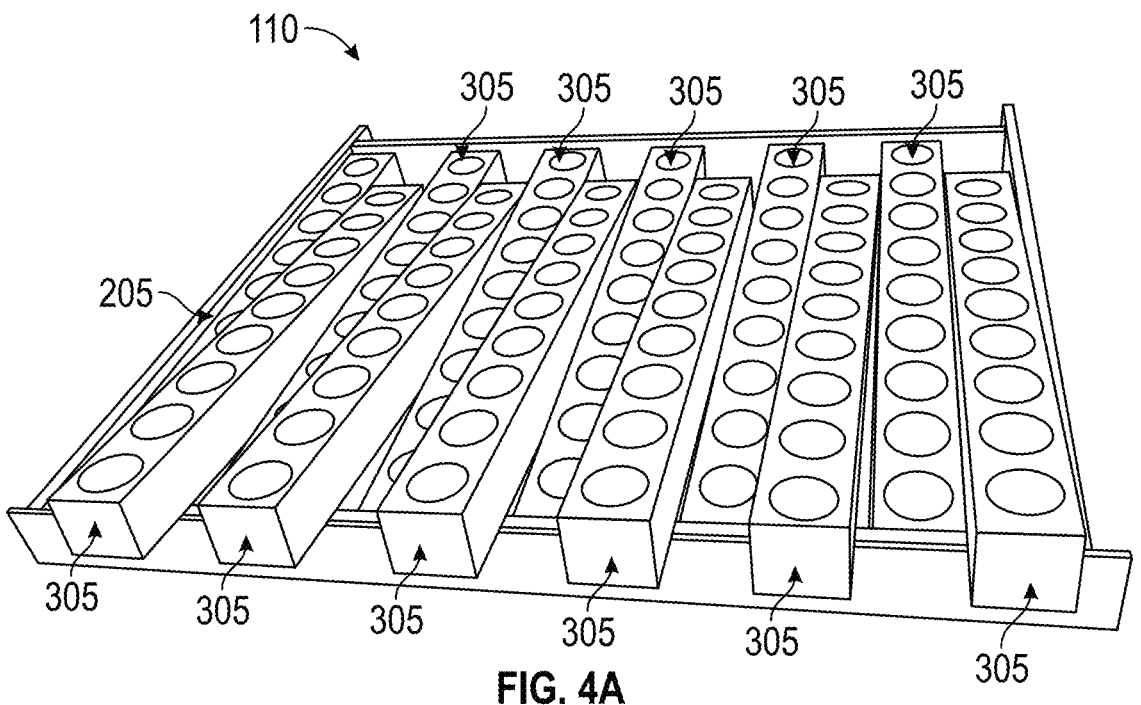
FIG. 4A depicts aspects of an extendable display tray, in accordance with the disclosed embodiments.

FIG. 4A illustrates a selection of display bars 305 being installed in the extendable display tray 110. The display tray 110 is configured to house a series of display bars 305 side by side. The display tray 110 can be sized to fit a set number of display bars 305 based on the width of the display bars 305. In FIG. 4A, twelve display bars 305 are illustrated in the display tray 110, but in other embodiments, the display tray 110 can be sized to fit different numbers and sizes of display bars 305.

Figure 4B:
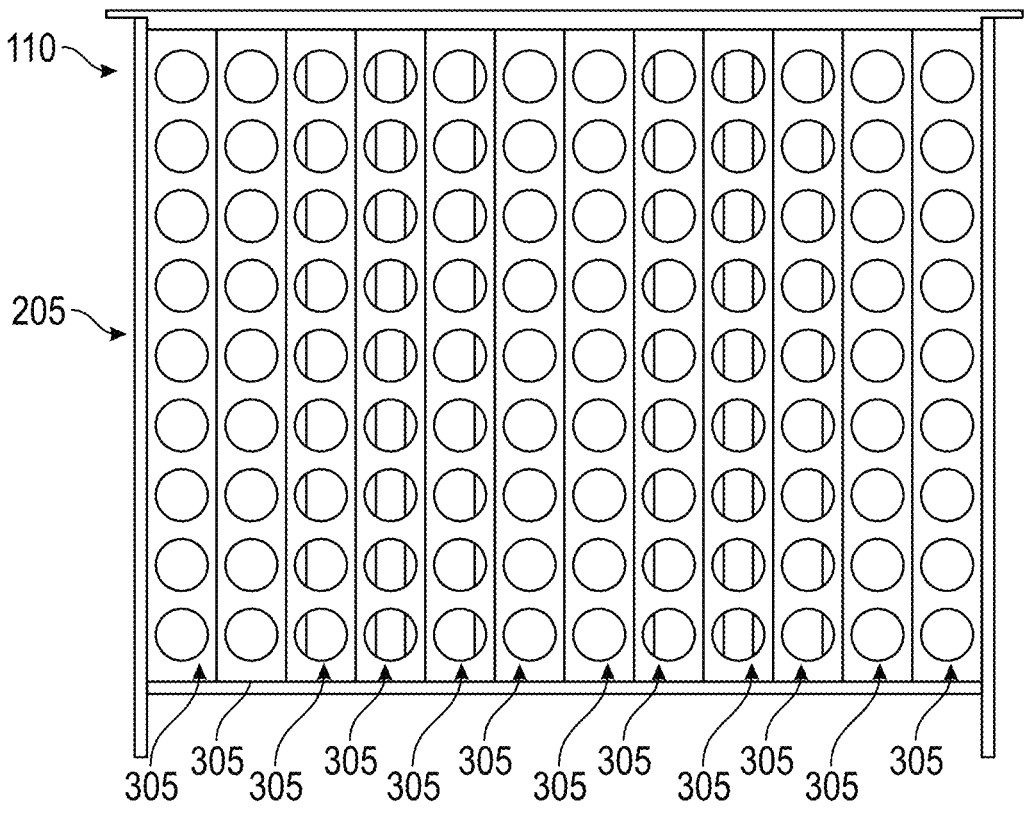
FIG. 4B depicts a top view of an extendable display tray with display bars disposed therein, in accordance with the disclosed embodiments.

FIG. 4B illustrates a top plan view of a display tray 110 with twelve display bars 305 mounted therein. As illustrated in FIG. 4B a plurality of display bars 305 can be fitted into the frame 215 so that the tubular channels 325 form an array or grid of openings, where a tobacco product can be vertically displayed.

Figure 4C:
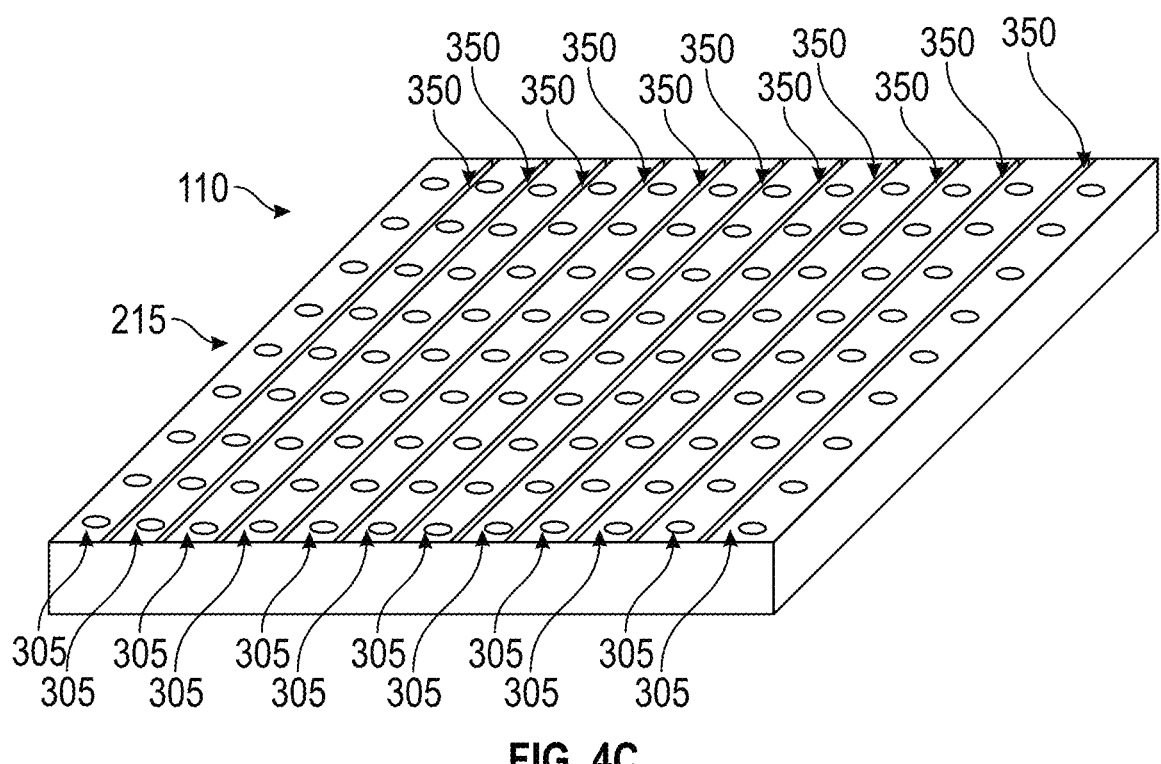
FIG. 4C depicts another embodiment of an extendable display tray, in accordance with the disclosed embodiments.
Figure 4D:
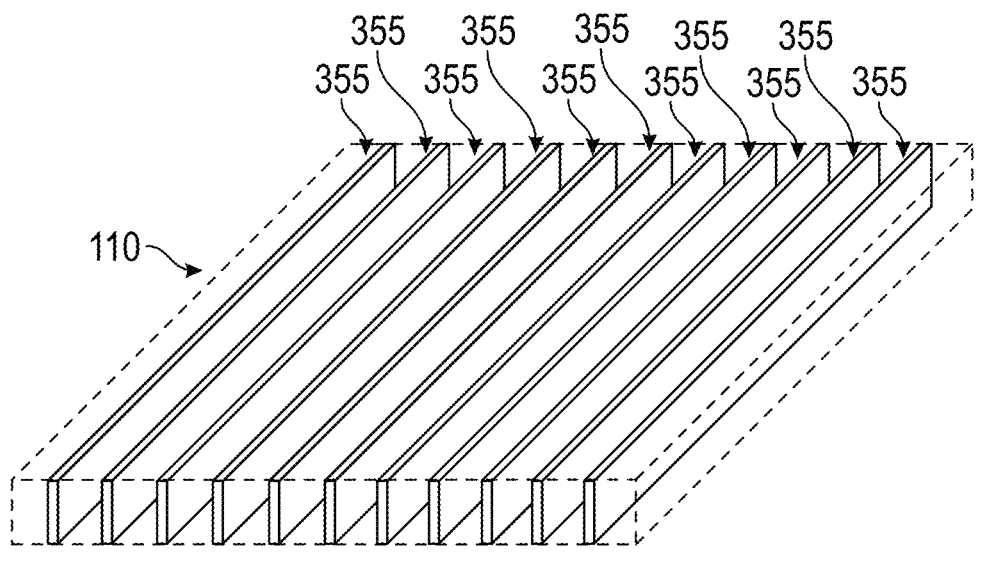
FIG. 4D depicts a top view of an extendable display tray with separator fins, in accordance with the disclosed embodiments.

FIG. 4C and FIG. 4D illustrate an alternative embodiment of the display tray 110. In the embodiment, illustrated in FIG. 4C and FIG. 4D, a series of separators 350 can be inserted into the frame 215. The separators 350 are configured to establish spacing between the display bars 305. The separators 350 can each comprise a thin top rail as shown in FIG. 4C, or as shown in FIG. 4D, can comprise a thin fin 355. The separators 350 establish even spacing between the display bars 305.

Figure 4E:
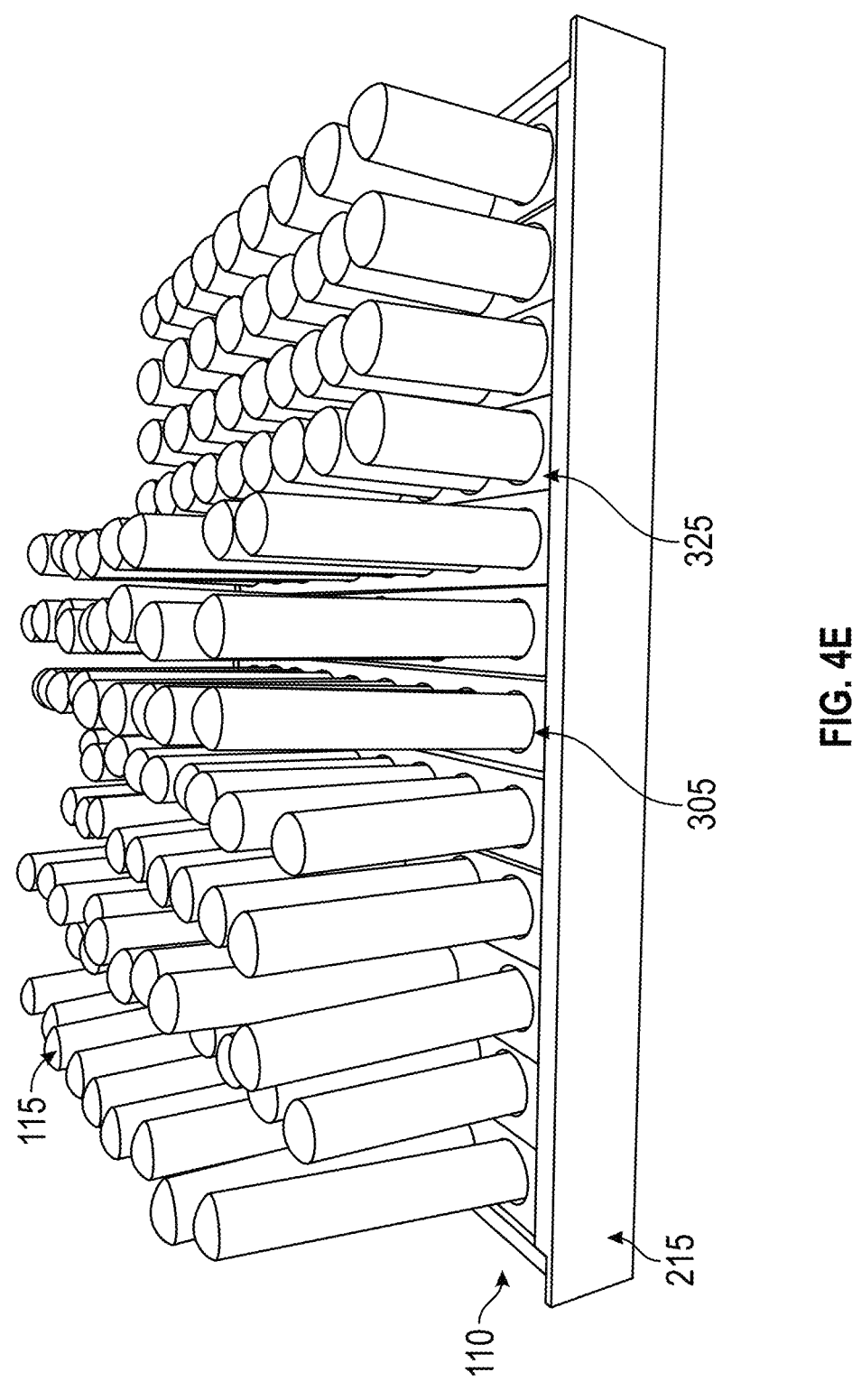
FIG. 4E depicts an extendable display tray displaying a product, in accordance with the disclosed embodiments.

FIG. 4E illustrates a display tray 110 filled with product 115. The product display tray 110 includes the display bars 305 with tubular channels 325 formed in rows on each of the display bars 305. The base 205 and frame 215 can be sized to house the plurality of display bars 305. In certain embodiments, the product 115 can comprise tobacco products including cigars, cigarettes, or other products. The tubular channels 325 can be configured to have a diameter sized to fit the tobacco products. The display bars 305 are arranged in the frame 215 formed around the base 205 such that the plurality of tubular channels 325 form a grid of tubular channels. As illustrated the products 115 can be inserted into the tubular channels 325 so that the products 115 stand vertically in the display tray 110.

In an embodiment the display tray 110 including the base, the frame formed around the base, and the plurality of display bars arranged inside the frame can be formed of wood. The wood structure provides a desirable aesthetic quality, but also preserves natural aromas and flavors associated with the product, and helps prevent moisture from accumulating on the product. In certain embodiments, the wood can be selected to be cedar such as Spanish cedar for its aesthetics and preferable aroma. It should be appreciated that, in other embodiments, the components disclosed herein can be formed from molded foam, metal, plastic, hard rubber, or combinations thereof.

Figure 5:
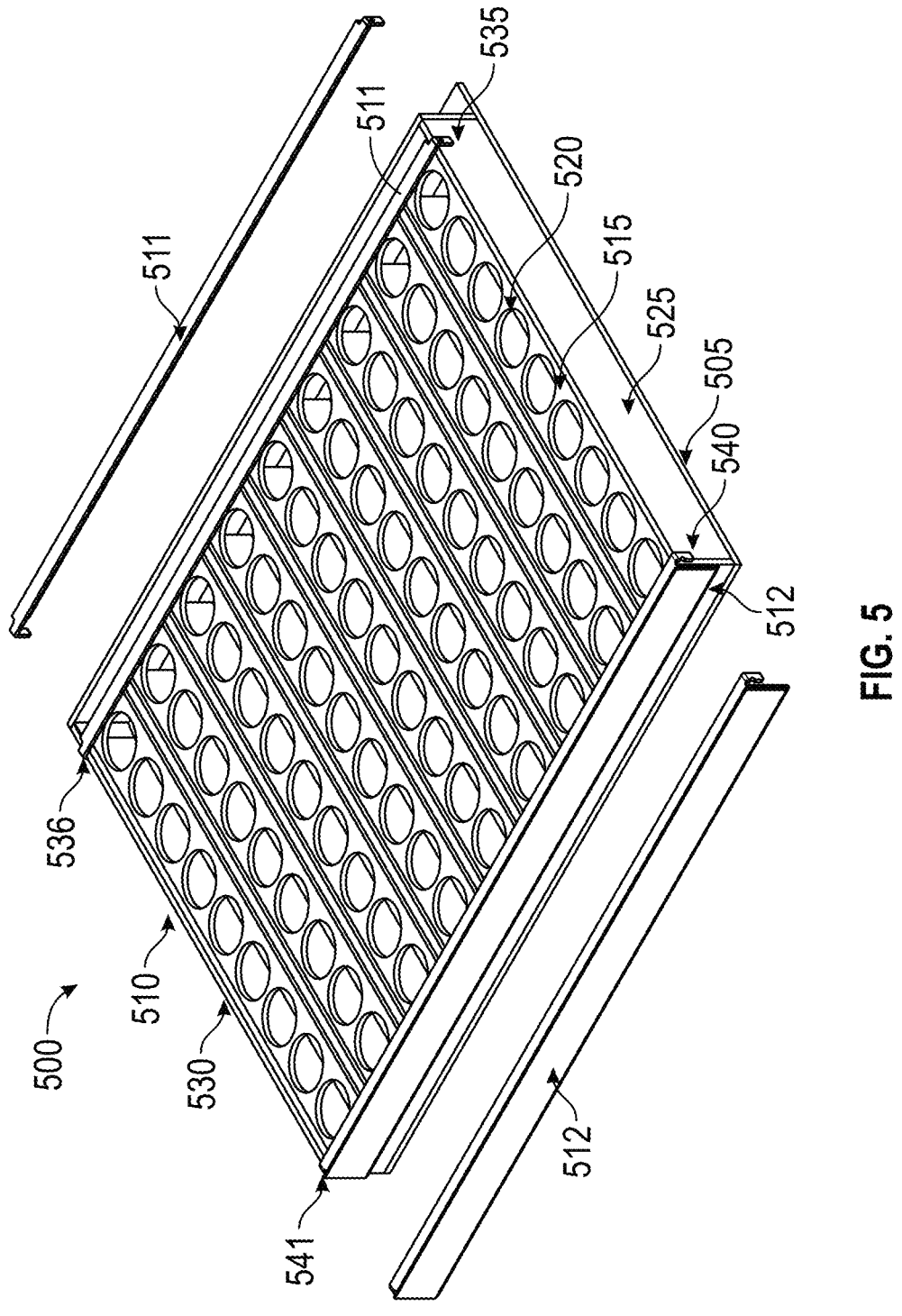
FIG. 5 depicts an alternative embodiment of a display tray, in accordance with the disclosed embodiments.

FIG. 5 illustrates an alternative embodiment of a product display tray 500. In the embodiment illustrated in FIG. 5, the product display tray 500 comprises a modular arrangement that can be assembled into a tray for displaying tobacco products. The product display tray 500 generally includes a base 505, a frame 510 formed around the base, and a series of top sheets 515, extending between two edges, side edge 511 and side edge 512, of the frame 510. Each of the top sheets 515 have a row of product stand holes 520 formed therein.

It should be appreciated that, in certain embodiments, a series of top sheets 515 can be disposed across the top of the display tray 500. The series of top sheets 515 sit side by side such that they form a grid of product stand holes 520. The spacing between the product stand holes 520 on each top sheet 515 can be identical, which will result in a uniform grid of product stand holes. In other embodiments, the spacing between the product stand holes 520 on the various top sheets 515 can be varied such that the product stand holes are configured into a design (e.g. concentric circles, triangles, arrangement into words, or other such shapes).

In other embodiments, the top sheet 515 can comprise a single top sheet that fits over the frame 510 and includes an array of product stand holes 520. In this embodiment, the location of the product stand holes 520 can be selected as a uniform grid, or can be selected to be another shape including a diamond, concentric circles, letters, etc.

As illustrated in FIG. 5, the side edge 511 can be removed and replaced in position between the side wall 525 and side wall 530, by snapping it into place in the mounting slot 535 formed in the side wall 525, and the mounting slot 536 formed in the side wall 530. Similarly, the side edge 512 can be removed and replaced in position between the side wall 525 and side wall 530, by snapping it into place in the mounting slot 540 formed in the side wall 525, and the mounting slot 541 formed in the side wall 530.

Figure 6:
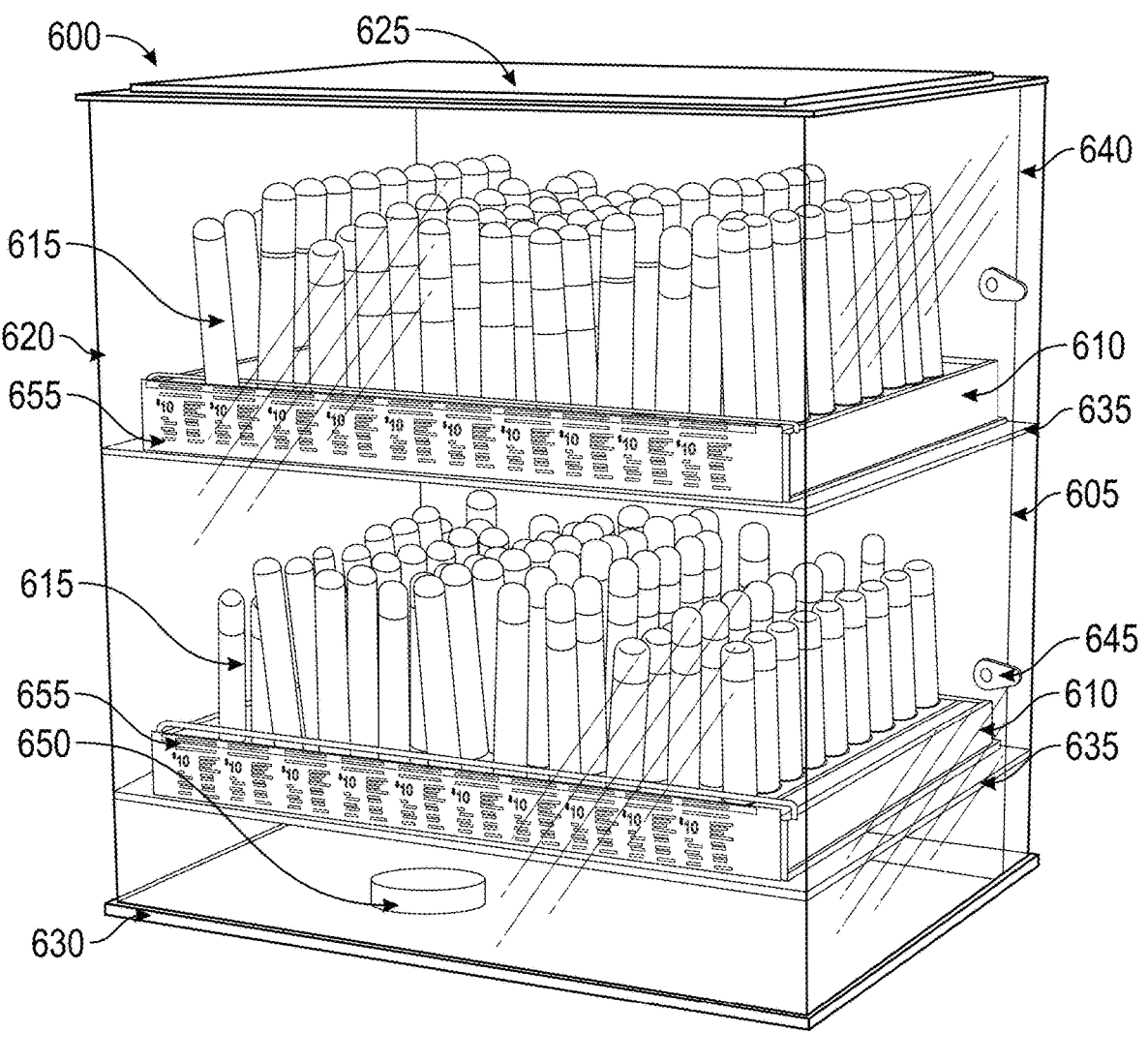
FIG. 6 depicts an alternative embodiment of a product display system, in accordance with the disclosed embodiments.

FIG. 6 illustrates another embodiment of a product display system 600. The product display system 600 can be a cigar display system 600, but in other embodiments the system can also be used to display other products. Generally, the cigar display system 600 comprises an enclosure 605, and at least one product tray 610 inside the enclosure 605.

The product tray 610 can be embodied as extendable display tray 110 or product display tray 500. The product tray 610 can thus generally comprise a base, a frame formed around the base, and a top sheet extending between two edges of the frame, the top sheet having a series of product stand holes formed therein. The product tray 610 can incorporate any other aspect of the display 110 and/or product tray 500 as disclosed herein.

The enclosure 605 can be configured as a transparent enclosure so that the products 615 in the enclosure 605 are visible from the outside. The enclosure 605 therefore can comprise a housing with vertical walls 620. The enclosure 605 can include a top 625 to enclose the top opening of the open ended housing. The top 625 can be removable. Similarly, enclosure can include a bottom 630 to enclose the bottom opening of the open ended housing. The bottom 630 can also be removable. The inside of the enclosure 605 can comprise a series of shelves 635. Two shelves 635 are illustrated in FIG. 6, but additional shelves 635 can be included in the enclosure 605 in other embodiments. The shelves 635 are configured to hold and display the product trays 610.

One side of the enclosure 605 can be configured as a door 640. The door 640 can be hinged on one side, and can include a latch 645 to secure the door 640 in a closed position. The closed enclosure 605 can further have a humidifier 650 disposed therein. The humidifier 650 can ensure the enclosure 605 stays at the desired level of humidity for the tobacco products 615 disposed therein.

The product display system 600 can further include a label 655. The label 655 is configured on the front 660 of the product tray 610. The label 655 can include a series of subsections. Each of the subsections can provide information such as name, characteristics, and price, related to the row of tobacco products 615 in the row directly behind the subsection of the label 655.

Figure 7A:
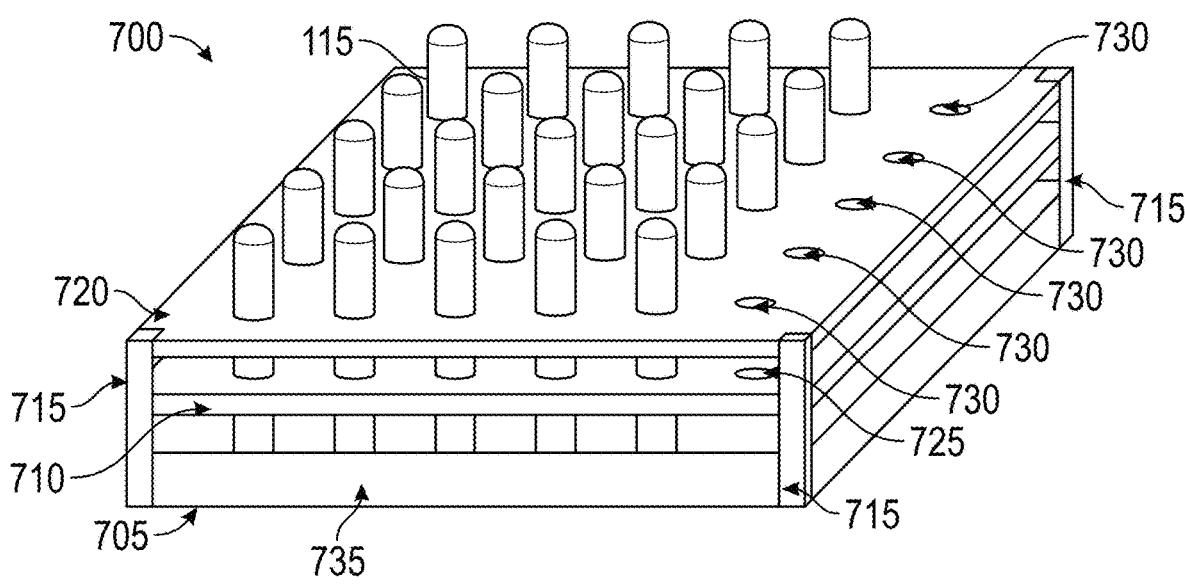
FIG. 7A depicts an alternative embodiment of a product display system, in accordance with the disclosed embodiments.

FIG. 7A illustrates another embodiment of a product display system 700 in accordance with the disclosed embodiments. The product display system 700 includes a base 705. In certain embodiments, the base 705 can comprise a series of slats configured to allow tobacco particles to filter out of the base for easy collection. In other embodiments, the base 705 can be a single piece. The base 705 can further comprise a frame 735. The frame 735 can enclose the base 705. In certain embodiments, the base 705 and frame 735 can be substantially equivalent to the base and frame described herein in other embodiments.

The base 705 and frame 735 can be attached to a first touch plate 710 and a second touch plate 720, with a series of corner pillars 715. The corner pillars 715 hold the first touch plate 710 above the base 705, and the second touch plate 720 above the first touch plate 710. The second touch plate 720 includes a plurality of mounting holes 730, through which a product 115 can be inserted. The mounting holes 730 can be arranged in an array, that can be in a variety of patterns as disclosed in other embodiments.

Figure 7B:
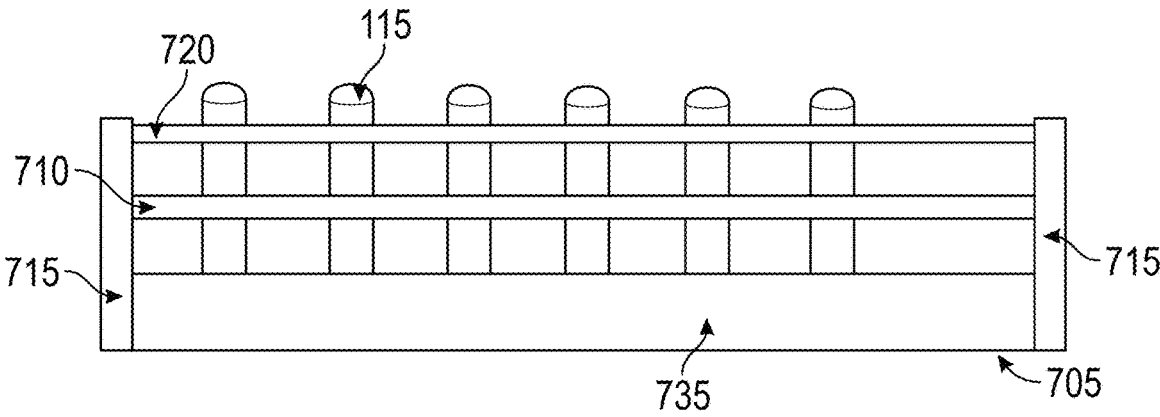
FIG. 7B depicts a side elevation view of an alternative embodiment of a product display system, in accordance with the disclosed embodiments.

The first touch plate 710 can be configured directly below the second touch plate 720, with a series of mounting holes 725. The mounting holes 725 can be configured to be directly below the mounting holes 730 in the second touch plate, such that a product 115 can be inserted through both mounting hole 730 in the second touch plate 720 and the mounting hole 725 in the first touch plate 710 directly below the mounting hole 730. In alternative embodiments, the alignment between a mounting hole 725 and mounting hole 730 can be slightly offset such that the product 115 inserted through the mounting hole 725 and mounting hole 730, is held at an angle or slant. The alignment of one or more of the sets of mounting hole 725 and mounting hole 730 can be selected to create angles or slants of the products inserted there through, to be aesthetically pleasing. FIG. 7B illustrates a side elevation view of the product display system 700.

Figure 8A:
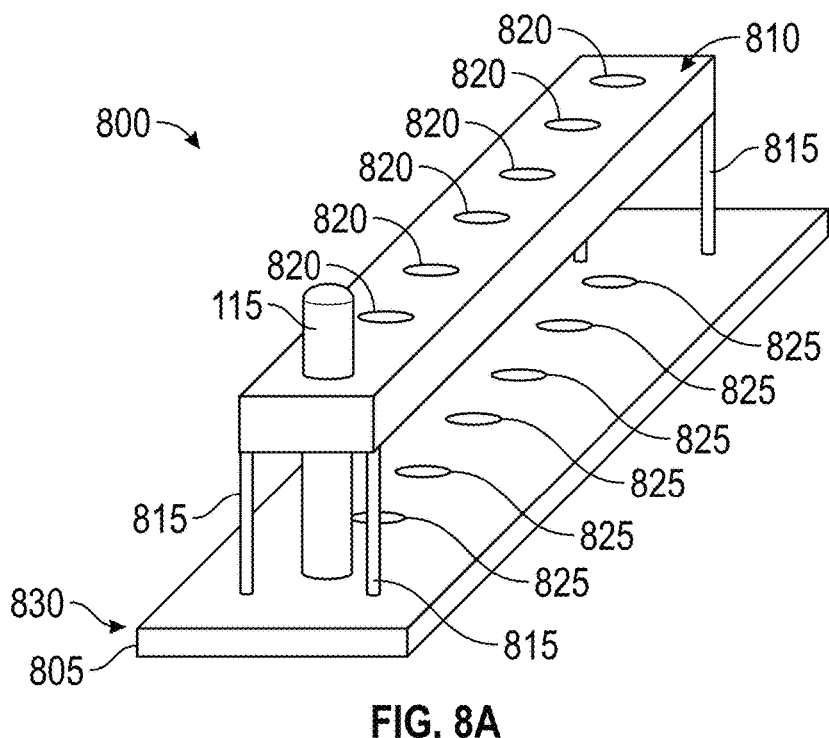
FIG. 8A depicts an alternative embodiment of a product display stand, in accordance with the disclosed embodiments.

FIG. 8A illustrates another embodiment of a product display stand system 800. The product display stand 800, can comprise a base 805 can comprise a series of slats configured to allow tobacco particles to filter out of the base for easy collection. In other embodiments, the base 805 can be a single piece. The base 805 can further comprise a frame 830. The frame 830 can enclose the base 805. In certain embodiments, the base 805 and frame 830 can be substantially equivalent to the base and frame described herein in other embodiments.

The base 805 and frame 830 can be attached to a raised display platform 810 with a series of corner pillars 815. The corner pillars 815 hold the raised display platform 810 above the base 705. The raised display platform 810 can include a plurality of mounting holes 820, through which a product 115 can be inserted. In FIG. 8A, the raised display platform 810 can include a single row of mounting holes 820. It should be appreciated that in other embodiments, the raised display platform 810 can be arranged with an array of mounting holes 820 as described in other embodiments, that can be in a variety of patterns as disclosed in other embodiments. The base 805 can further include a series of product indentions 825. The product indentions 825 can be arranged to be directly below the mounting holes 820, in the base 805, and can be configured to cradle the end of product 115.

Figure 8B:
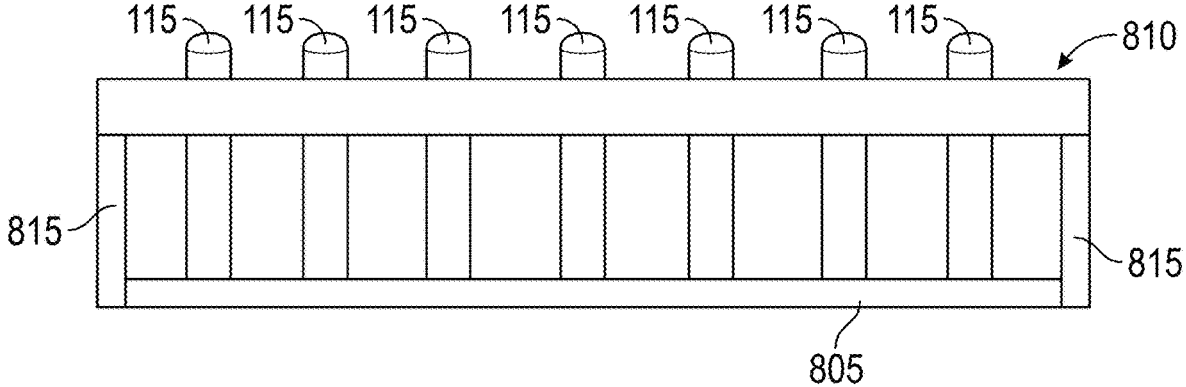
FIG. 8B depicts a side elevation view of an alternative embodiment of a product display stand, in accordance with the disclosed embodiments.

FIG. 8B illustrates a side elevation view of the product display stand system 800, with a selection of products 115 standing in the display system.

Figure 9:
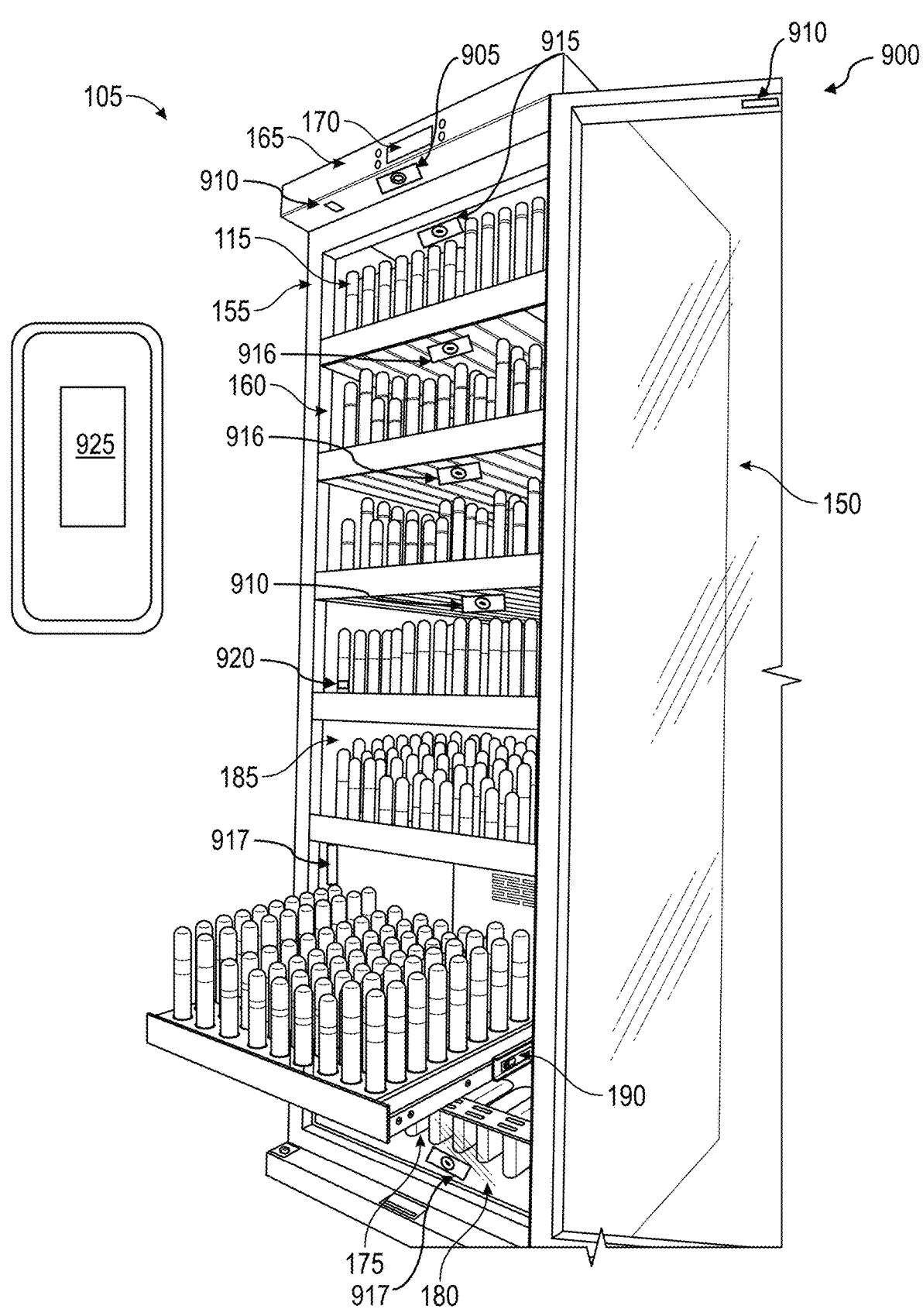
FIG. 9 depicts a product display system, in accordance with the disclosed embodiments.
Figure 10:
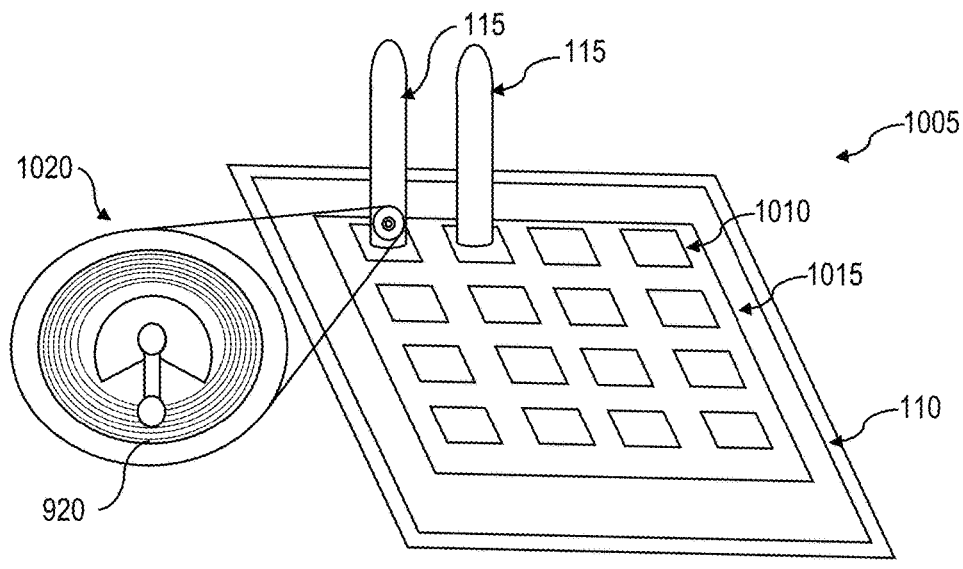
FIG. 10 depicts an RFID foot sensor pad, in accordance with the disclosed embodiments.

In additional embodiments, smart lock, camera, and product identification technology can be incorporated in a humidor 105 in accordance with the disclosed embodiments. FIG. 9 illustrates one such embodiment, of a humidor system 900. In certain embodiments, the system 900 can include a humidor 105 as illustrated in FIG. 2B. The humidor system 900 can further include a camera 905 configured inside the humidor 105. The camera 905 can be operably connected to a computer system with an inventory management system 925 used for product inventory management. The inventory management system 925 can include a database of products currently stored in the humidor. The camera 905 can take video or photographic images of the products 115 in the humidor 105. When a product 115 is removed for sale, the camera 905 can identify the product 115 that has been removed and update the inventory management system 925. Likewise, when new product inventory is added to the humidor 105, the camera 905 can collect images of the newly added inventory and update the inventory management system 925 accordingly.

In certain embodiments, a smart lock 910 can be configured on the door of the humidor 105 as well as the door frame. The smart lock 910 can comprise an electronic mechanism for controlling access to the products 115 in the humidor 105. The smart lock 910 can be embodied as a lock with a keypad for entering a code to open the smart lock 910, or as a lock controlled by an associated mobile device or key card. The smart lock 910 can be used to limit access to the humidor 105 and can be used for tracking when the humidor 105 has been opened, who opened the humidor 105 (based on the associated key card, mobile device, or code) and whether product 115 has been added to or removed from the humidor 105.

In certain embodiments, one or more RFID readers 915, including but not limited to a dome style tag reader 916 and a wand style tag reader 917, can be installed in the humidor 105. In an exemplary embodiment, the RFID reader 915 can be installed in one or more locations including the bottom of the humidor, below each tray 110 in the humidor, and at the top of the humidor 105. Each of the products 115, or product packaging can be fitted with an RFID tag 920. In certain embodiments, this can include fitting the ring of the cigar, tube of the cigar, plastic sleeve for the cigar, or other such packaging, with RFID tag 920.

When a cigar is removed from the humidor 105, the nearest RFID reader 915 and/or camera 905 can be used to identify the product 115 via the RFID tag 920. The RFID reader 915 can be used to notify the inventory management system 925 that the product 115 has been removed, and the inventory management system 925 can update its database accordingly. Likewise, when new product 115 is added to the humidor 105, the RFID reader(s) 915, can identify the RFID tag 920 associated with the product 115, and can notify the inventory management system 925. The inventory management system 925 can update the associated database to note that new product 115 has been added to the humidor 105.

In certain embodiments, an RFID foot pad circuit board 1005 can be used for product 115 inventory tracking. The foot pad circuit board 1005 can be installed on a tray 110. The foot pad circuit board 1005 can include RFID sensors 1010 formed on circuit board 1015. The RFID sensors 1010 can roughly align with holes formed in the slats so that the sensors 1010 are proximate to the ends of the products 115 and associated RFID tags 920, illustrated in exploded view 1020.

Figure 11:
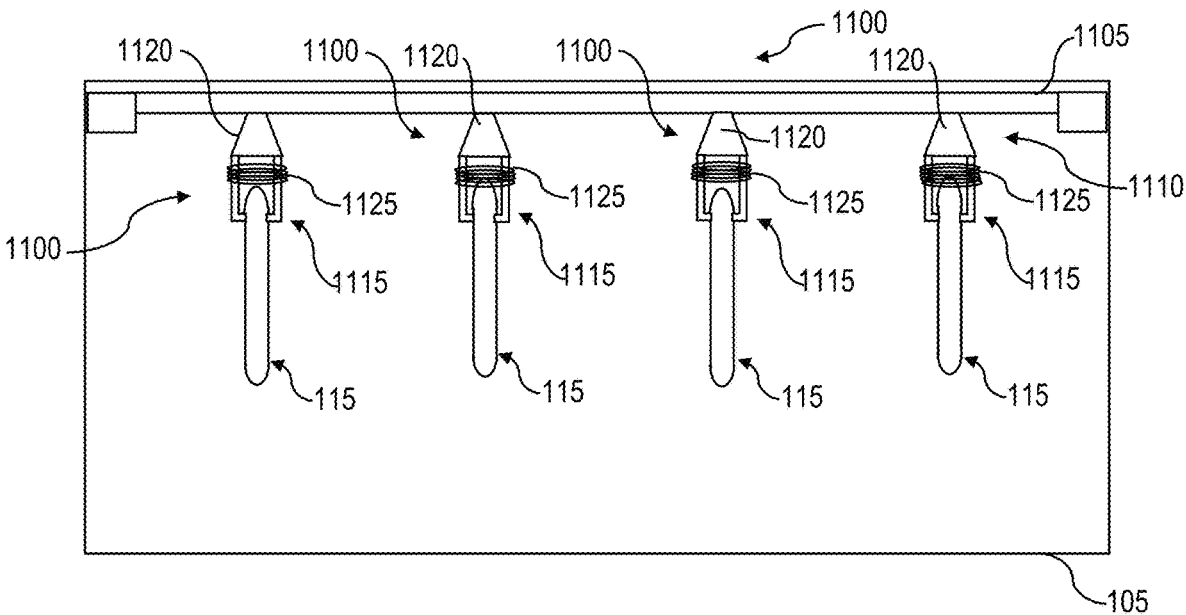
FIG. 11 depicts a hanging product display system, in accordance with the disclosed embodiments.

In an embodiment, a cigar display system 1100 can be configured to hang one or more tobacco products 115 in rows in a vertical orientation in a humidor 105 as disclosed herein. Aspects of the humidor can mirror those disclosed in other embodiments. In such embodiments, a tray 1105 can be configured with a series of vertical cigar hangers 1110. The vertical cigar hangers 1110 can comprise jaws 1115 with a first jaw and second jaw operably mounted with a pivot 1120 to the tray 1105. A spring 1125 can be configured around the jaws 1115 to bias the jaws inwardly to hold the product 115. The hangers 1110 can comprise 18-8 stainless steel or other such material. It should be noted in the perspective view of FIG. 11 one row of hangers is visible, but that additional hangers can be provided in a grid pattern (some of which are not visible in FIG. 11).

Figure 12:
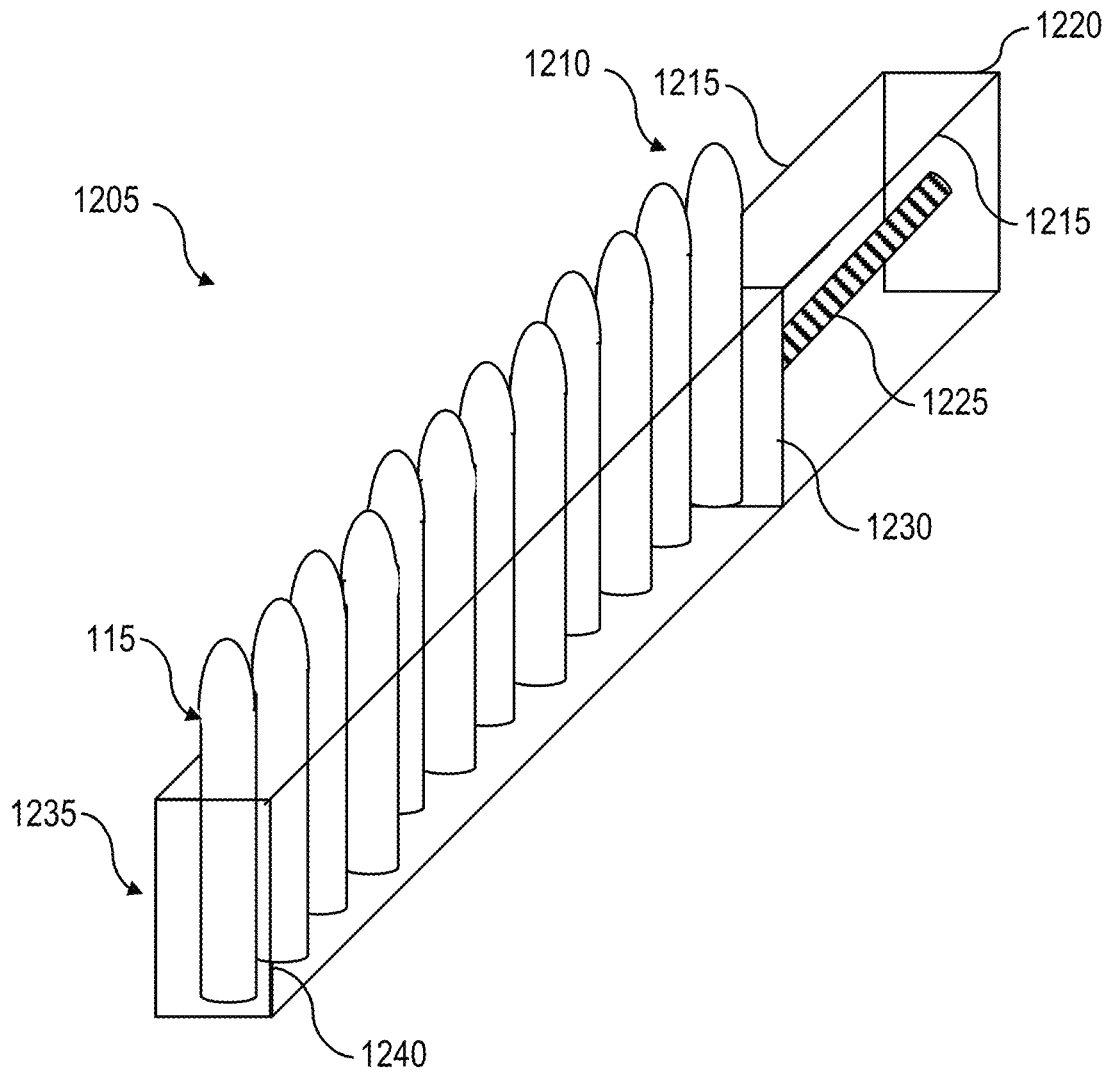
FIG. 12 depicts aspects of a spring fed display bar, in accordance with the disclosed embodiments.

In another embodiment, illustrated in FIG. 12, one or more loaded spring channel assemblies 1205 can be configured on tray 110. In such embodiments, a product channel 1210 can be configured with two vertical walls 1215 spaced such that a product 115 can stand vertically in between the walls 1215. The walls can further be configured to run the length of the tray 110, such that a plurality of products 110 can be stood up between the walls 1215, one behind the next.

At the terminal end of the channel 1210 a spring mount wall 1220 can be configured with a first spring 1225 which can be attached to the spring mount wall. The other end of the spring 1225 can be attached to a product dispensing platform 1230. The product dispensing platform can comprise a vertical brace configured to push the series of vertical products 115 toward the end of the channel 1210. The front facing end 1235 of the channel can comprise a see through (e.g., glass, plexiglass, see through plastic, etc.) brace 1240. The brace 1240 need not be as high as the channel walls 1215 but can be, in certain embodiments.

In the embodiment illustrated in FIG. 12, the product 115 is vertically displayed. As the product 115 at the front of the series of products 115 is removed, the pressure from the spring 1225 and dispensing platform 1230 can push the next product 115 in line to the front of the channel 1210.

It should be appreciated that multiple spring loaded channel assemblies 1205 can be arranged side by side on a tray 110. In such embodiments, the display then shows the first cigar 115 in each channel.

Figure 13A:
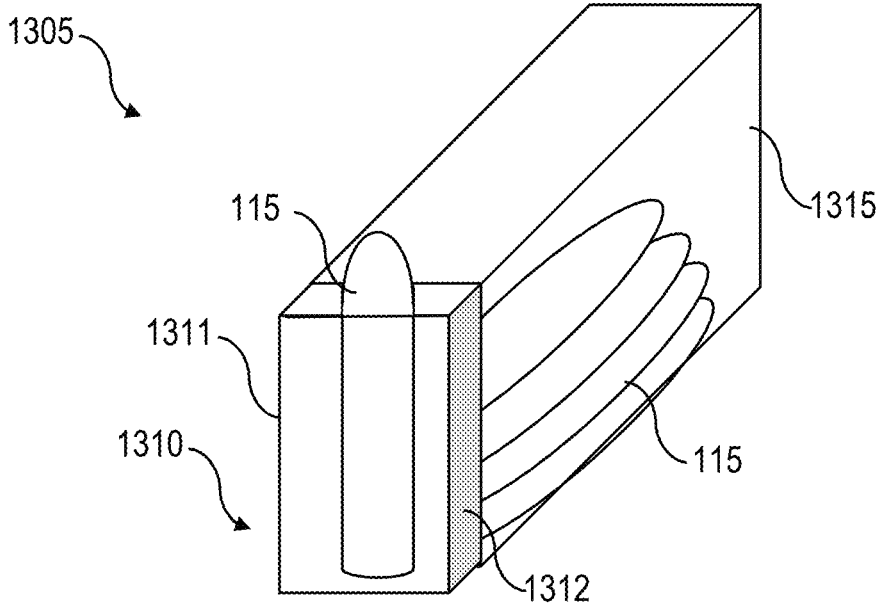
FIG. 13A depicts aspects of another embodiment of a display bar, in accordance with the disclosed embodiments.

FIG. 13A illustrates another embodiment of a product display channel 1305 in accordance with the disclosed embodiments. Product display channel 1305 can comprise a forward facing product display 1310. The product display 1310 can comprise a channel or tube of sufficient dimensions, to allow a single product 115 to stand vertically. The product display 1310 can be transparent along its front face 1311 and side faces 1312. The product display channel 1305 further comprises a rear channel 1315. The rear channel 1315 is selected to have depth so that a plurality of products 115 can be stored in the rear channel 1315. In certain embodiments, a plurality of product display channels 1305 can be configured in a tray 110, such that each of the product displays align at the front of the tray 110 to display to consumers, which stock product 115 is held in the rear channel 1315.

Figure 13B:
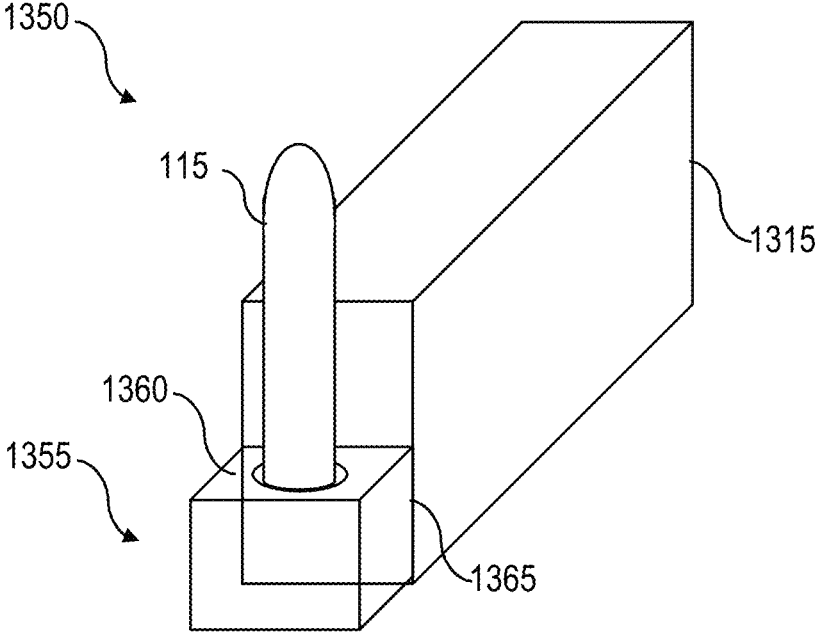

FIG. 13B illustrates another embodiment of a product display channel 1350 in accordance with the disclosed embodiments. Product display channel 1350 can comprise a forward facing product display block 1355. The product display block 1355 can comprise a block 1360 with a hole 1365 sized to fit a product 115. The product display channel 1305 further comprises a rear channel 1350. The rear channel 1315 is selected to have depth so that a plurality of products 115 can be stored in the rear channel 1315. In certain embodiments, a plurality of product display channels 1350 and/or 1305 can be configured in a tray 110, such that each of the product displays align at the front of the tray 110 for display to consumers, which stock product 115 is held in the rear channel 1315.

Figure 14:
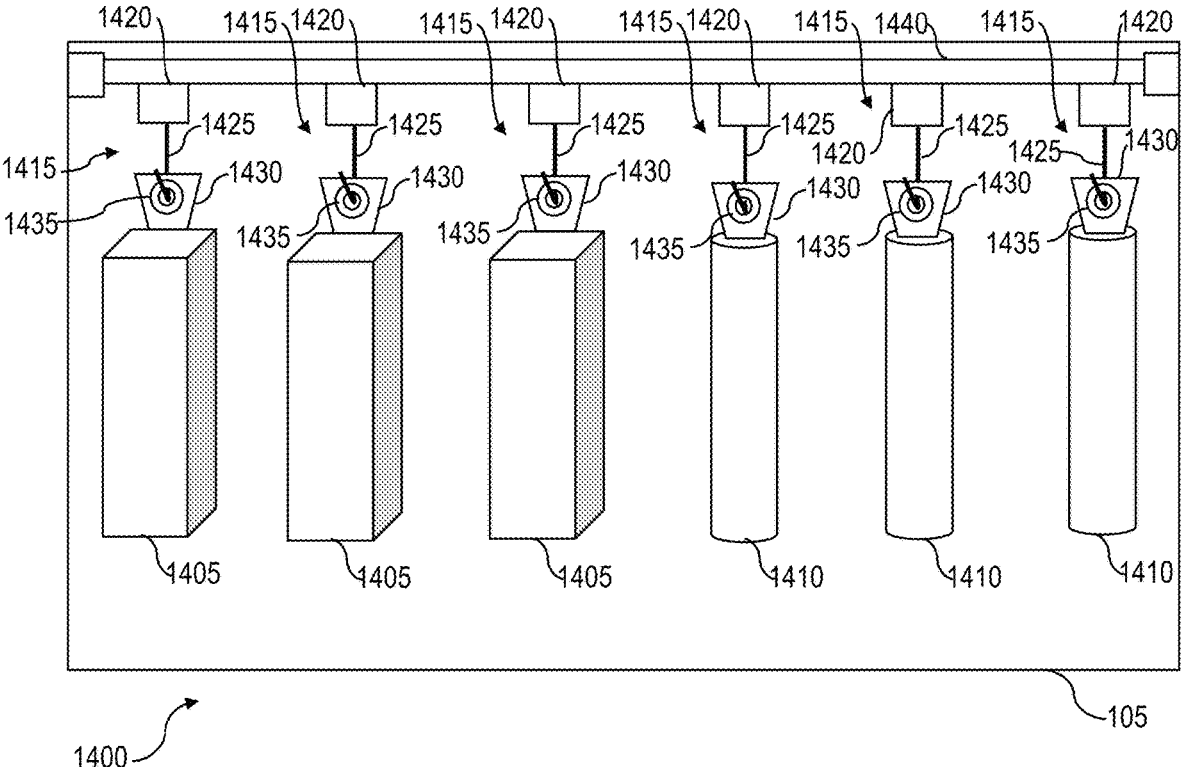
FIG. 14 depicts another embodiment of a hanging product display system, in accordance with the disclosed embodiments.

In an embodiment, a cigar display system 1400 can be configured to hang one or more tobacco products 115 in boxes 1405 or tubes 1410, in rows in a vertical orientation in a humidor 105 as disclosed herein. Aspects of the humidor 105 can mirror those disclosed in other embodiments. In such embodiments, a tray 1440 can be configured with a series of vertical cigar hanger posts 1415. The vertical cigar hanger posts 1415 can comprise a top mount 1420 with a hanging hook 1425 attached thereto. The boxes 1405 and/or tubes 1410 can include a tab 1430 with a hook hole 1435, configured to fit over hanger hooks 1425. It should be noted in the perspective view of FIG. 14 one row of hangers is visible, but that additional hangers can be provided in a grid pattern (some of which are not visible in FIG. 14).

Figure 15A:
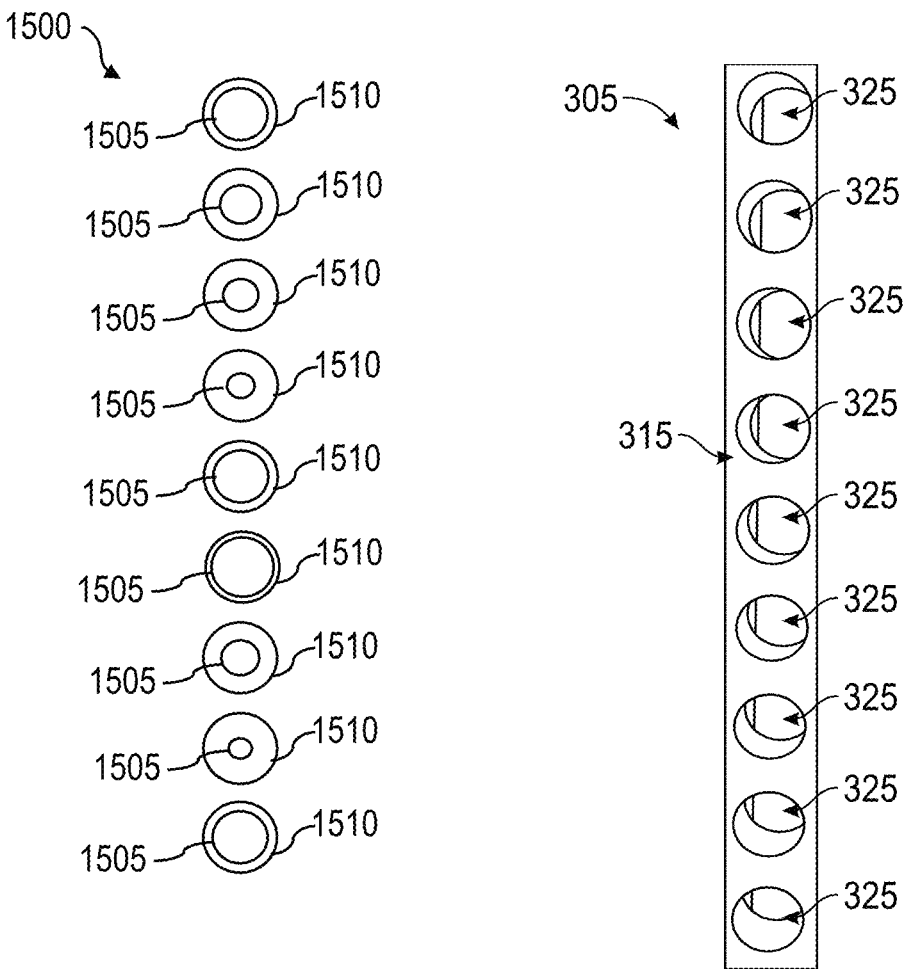
FIG. 15A depicts aspects of a display bar and display bar inserts, in accordance with the disclosed embodiments.

FIG. 15A illustrates a series of inserts 1500 which can be inserted into tubular channels 325. The inserts 1500 can have varying inner diameters 1505, which can be selected to fit various sized products 115. The outer diameter 1510 of the inserts 1500 can be sized to match the associated tubular channel 325 diameters. Thus, in certain embodiments, the inserts 1500 of a desired size can be inserted into the tubular channels 325, to accommodate products of a given size.

Figure 15B:
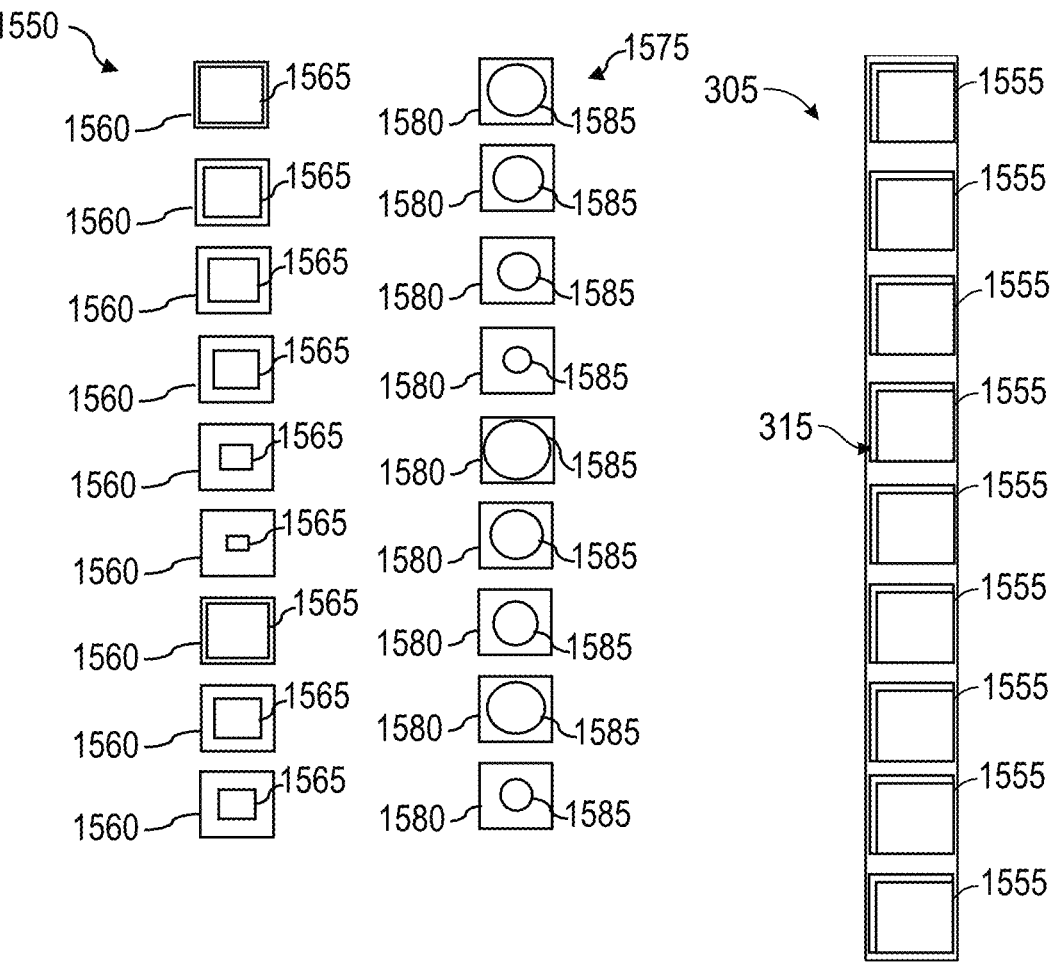
FIG. 15B depicts aspects of a display bar and display bar inserts, in accordance with the disclosed embodiments.

FIG. 15B illustrates a series of inserts 1550 which can be inserted into square channels 1555 and a series of inserts 1575 that can be inserted into square channels 1555 in display block 305. The inserts 1550 can have squared outer sides 1560 and square shaped inner surfaces 1565 of varying sizes which can be selected to fit various sized products 115. Inserts 1575 can have squared outer sides 1580 and circular varying inner diameters 1585, which can be selected to fit various sized products 115. The outer diameter 1510 of the inserts 1550 and inserts 1575 can be sized to match the associated square channels 1555 diameters. Thus, in certain embodiments, the inserts 1550 and inserts 1575 of a desired size can be inserted into the tubular channels 1555, to accommodate products 115 of a given size.

Figure 16:
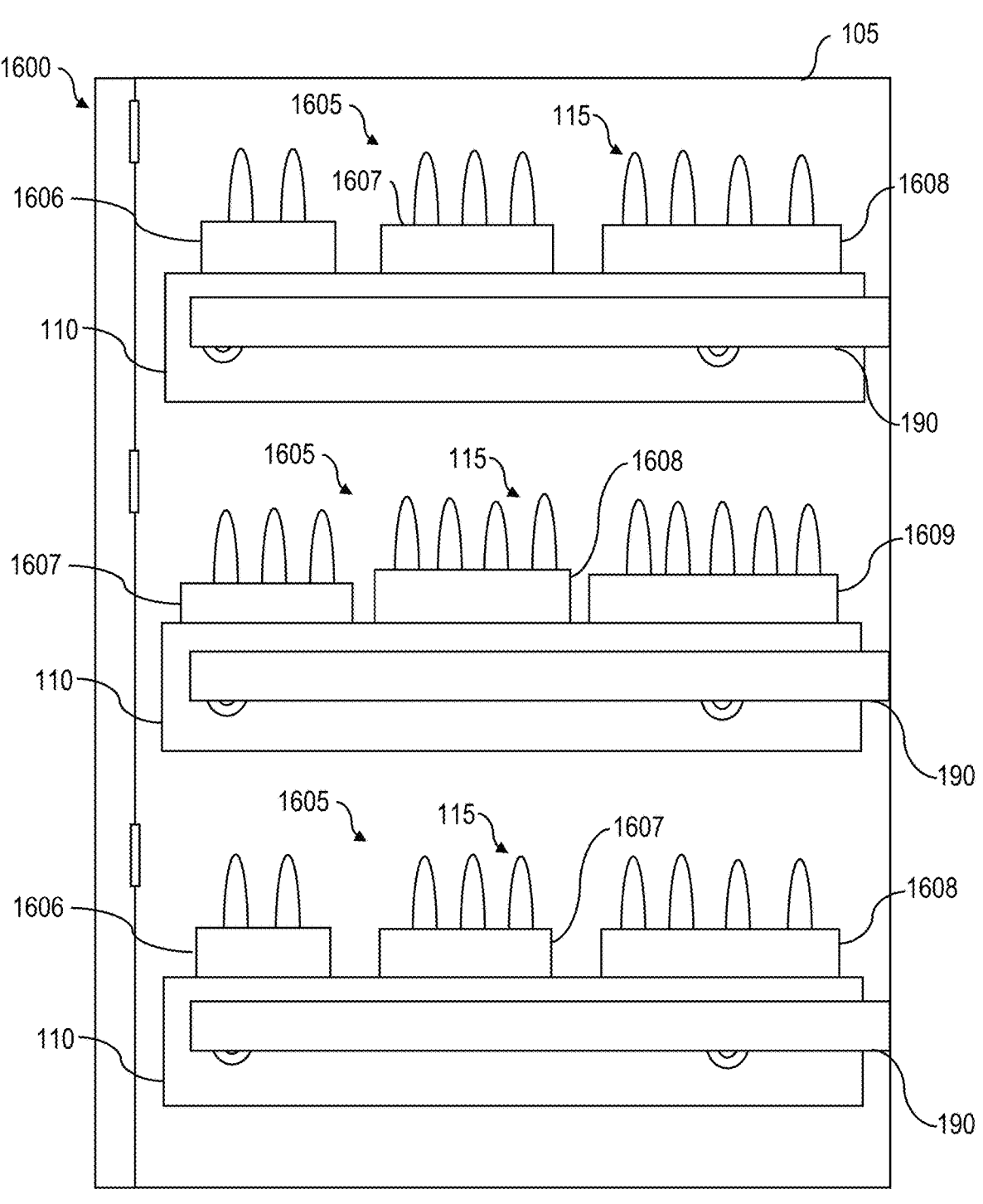
FIG. 16 depicts embodiments of another product display system, in accordance with the disclosed embodiments.

FIG. 16 illustrates an alternative embodiment of a display system 1600 in accordance with the disclosed embodiments. The display system 1600, can incorporate various aspects of a humidor 105 as further detailed in other embodiments. The display system 1600 further includes set size display blocks 1605, which can share aspects of display blocks 305. The display blocks 1605 can be configured to hold a pre-defined number of products 115. For example, in FIG. 16, set size display block 1606 is configured to hold 3 products 115, set size display block 1607 is configured to hold 4 products 115, set size display block 1608 is configured to hold 5 products 115, and set size display block 1609 is configured to hold 5 products 115. As illustrated in FIG. 16, one more set size display bocks 1605 can be arranged end to end in tray 110.

Figure 17A:
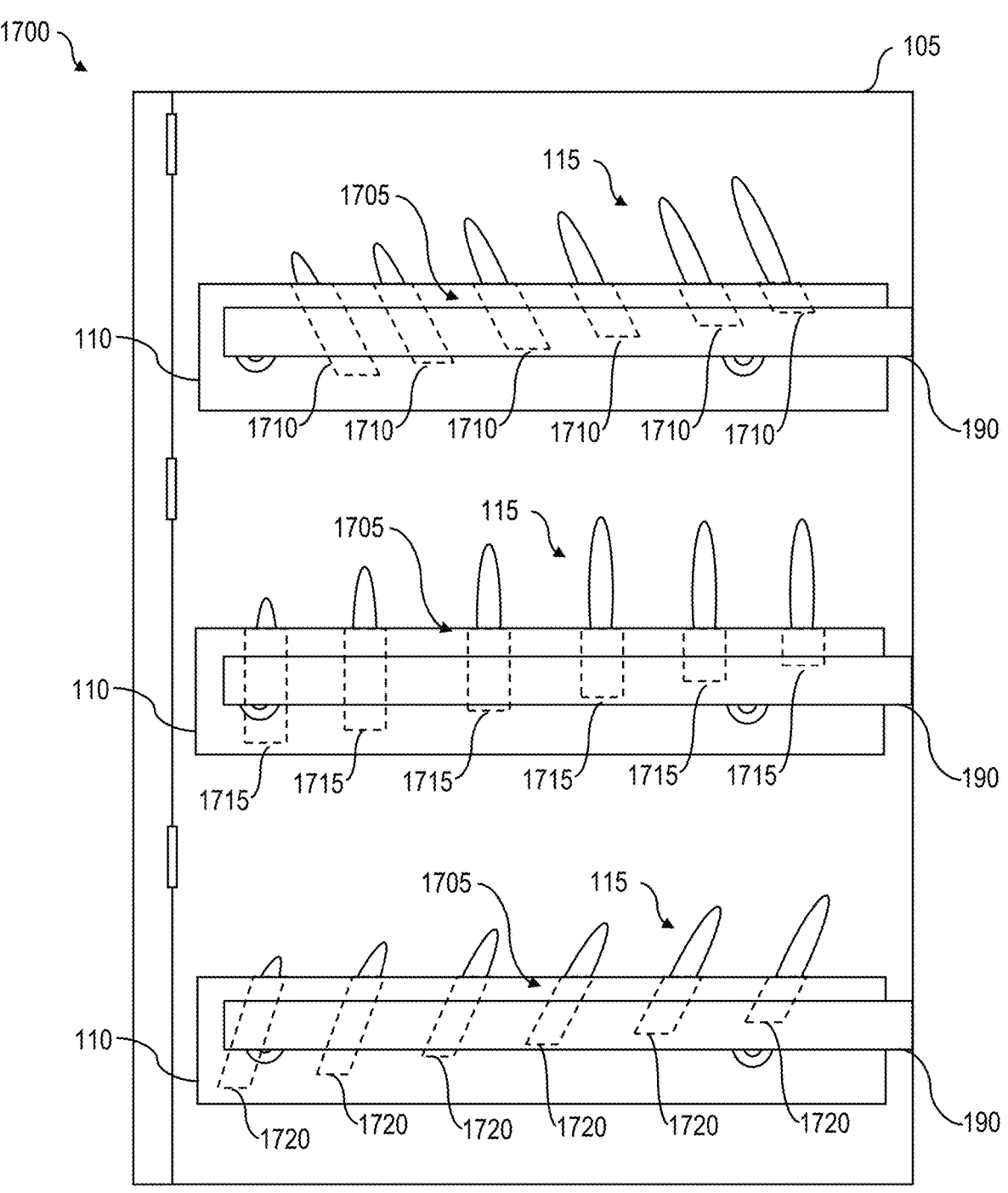
FIG. 17A depicts embodiments of another product display system, in accordance with the disclosed embodiments.

FIG. 17A provides a side perspective view of a humidor 105, illustrating aspects of a product display system 1700 in accordance with the disclosed embodiments. The display system 1700 includes a tray 110 which includes a series of product channels 1705. As illustrated in FIG. 17A, the product channels 1705 can be configured to be forward slanted product channels 1710. In certain embodiments, the depth of the channels can be varied to display products 115 at different heights. In certain embodiments, the depth of the vertical product channels 1715 can be varied from deepest to least deep so that products at the front of the tray 110 are lower than products at the back of the tray. As illustrated in FIG. 17A, the product channels 1705 can be configured to be reward slanted product channels 1720.

Figure 17B:
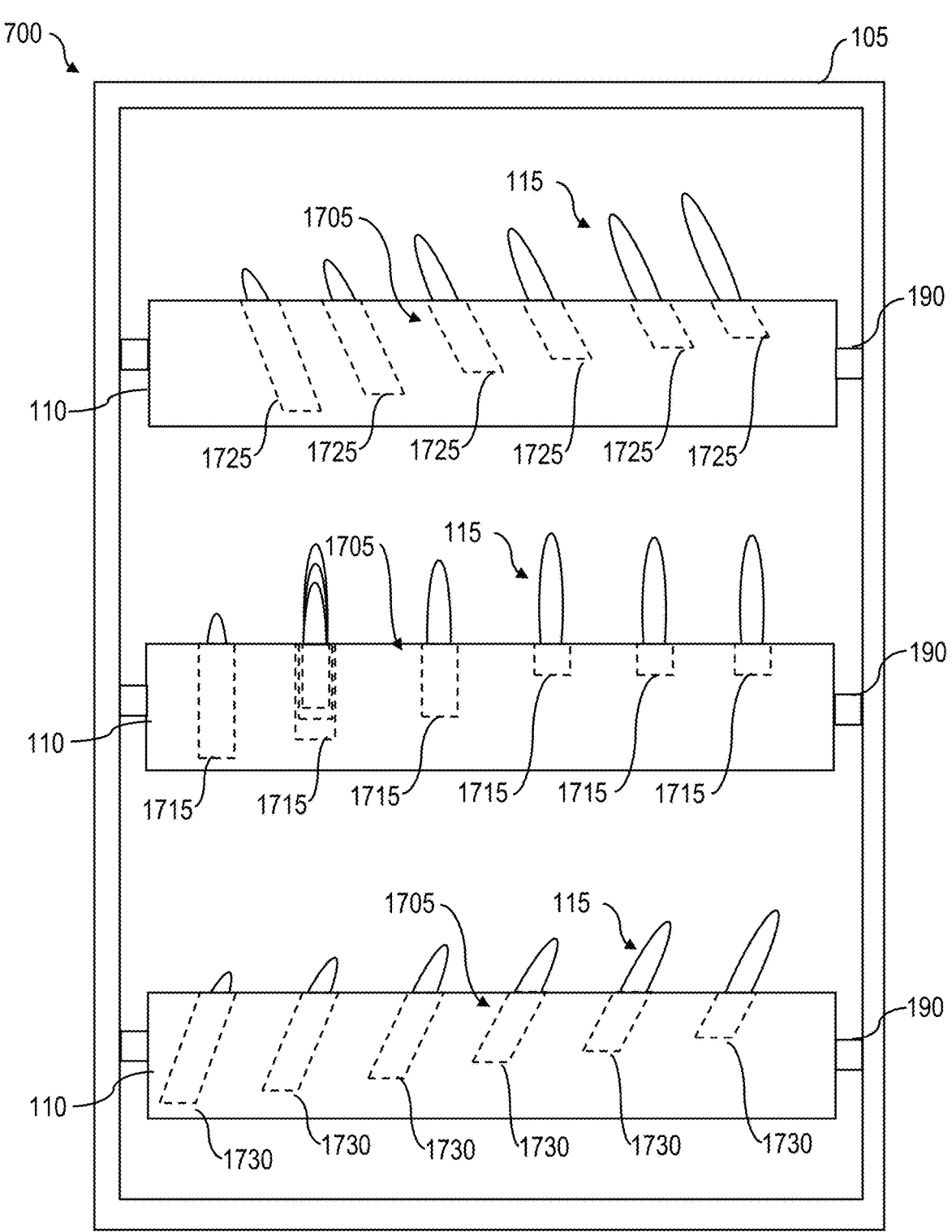
FIG. 17B depicts embodiments of another product display system, in accordance with the disclosed embodiments.

FIG. 17B provides a front perspective view of a humidor 105, illustrating aspects of a product display system 1700, in accordance with the disclosed embodiments. The display system 1700 includes a tray 110 which includes a series of product channels 1705. As illustrated in FIG. 17B, the product channels 1705 can be configured to be left slanted product channels 1725. In certain embodiments, the depth of the channels can be varied to display products 115 at different heights. In certain embodiments, the depth of the vertical product channels 1715 can be varied from deepest to least deep so that products at the front of the tray 110 are lower than products at the back of the tray. As illustrated in FIG. 17B, the product channels 1705 can be configured to be rightward slanted product channels 1730.

Figure 17C:
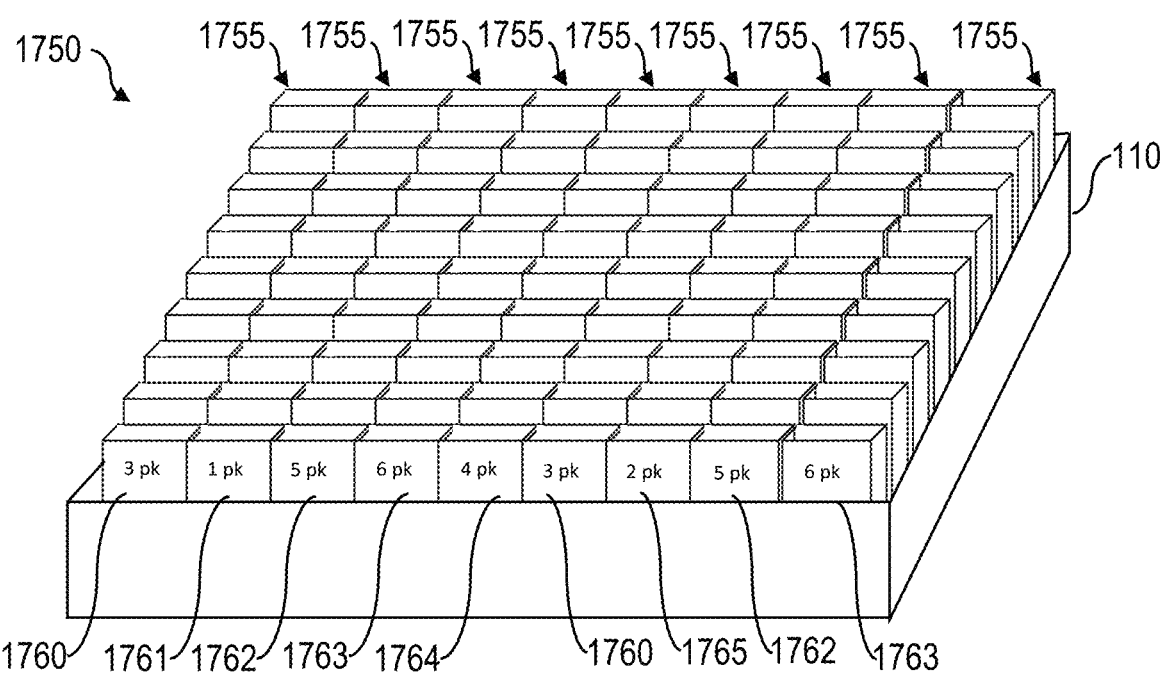
FIG. 17C depicts embodiments of another product display system, in accordance with the disclosed embodiments.

FIG. 17C illustrates aspects of a product display system 1750 in accordance with the disclosed embodiments. In this embodiment, boxed products 115 can be arranged in a tray 110. The boxed products can be arranged in the tray in a vertical orientation in rows 1755. The boxed products can be assorted in packs with varying numbers of products 115 therein. This can include a 1 pack 1761, a 2 pack 1765, a 3 pack 1760, a 4 pack 1764, a 5 pack 1762, and a 6 pack 1763.

Figure 17D:
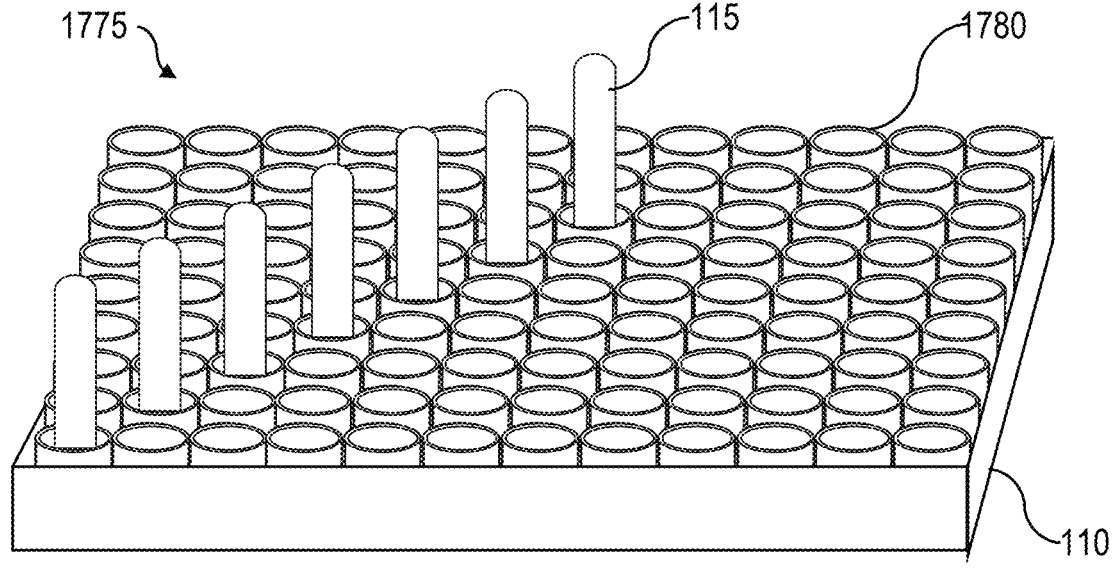
FIG. 17D depicts embodiments of another product display system, in accordance with the disclosed embodiments.

FIG. 17D illustrates aspects of another embodiment of a product display system 1775 in accordance with the disclosed embodiments. In certain embodiments, an array 1785 of tubular channels 1780 can be arranged on a tray 110. The tubular channels 1780 can be arranged in rows, or in other configurations according to design configurations. The tubular channels can comprise acrylic channels, metal channels, wood channels or other such material. The tubular channels 1780 can be configured to allow products 115 to be inserted into the channels to be vertically displayed. In certain embodiments, the tubular channels 1780 can be bound to one another with an adhesive. In other embodiments, each of the tubular channels 1780 can be independent in relation to each of the other tubular channels 1780 in the array 1785.

Figure 18:
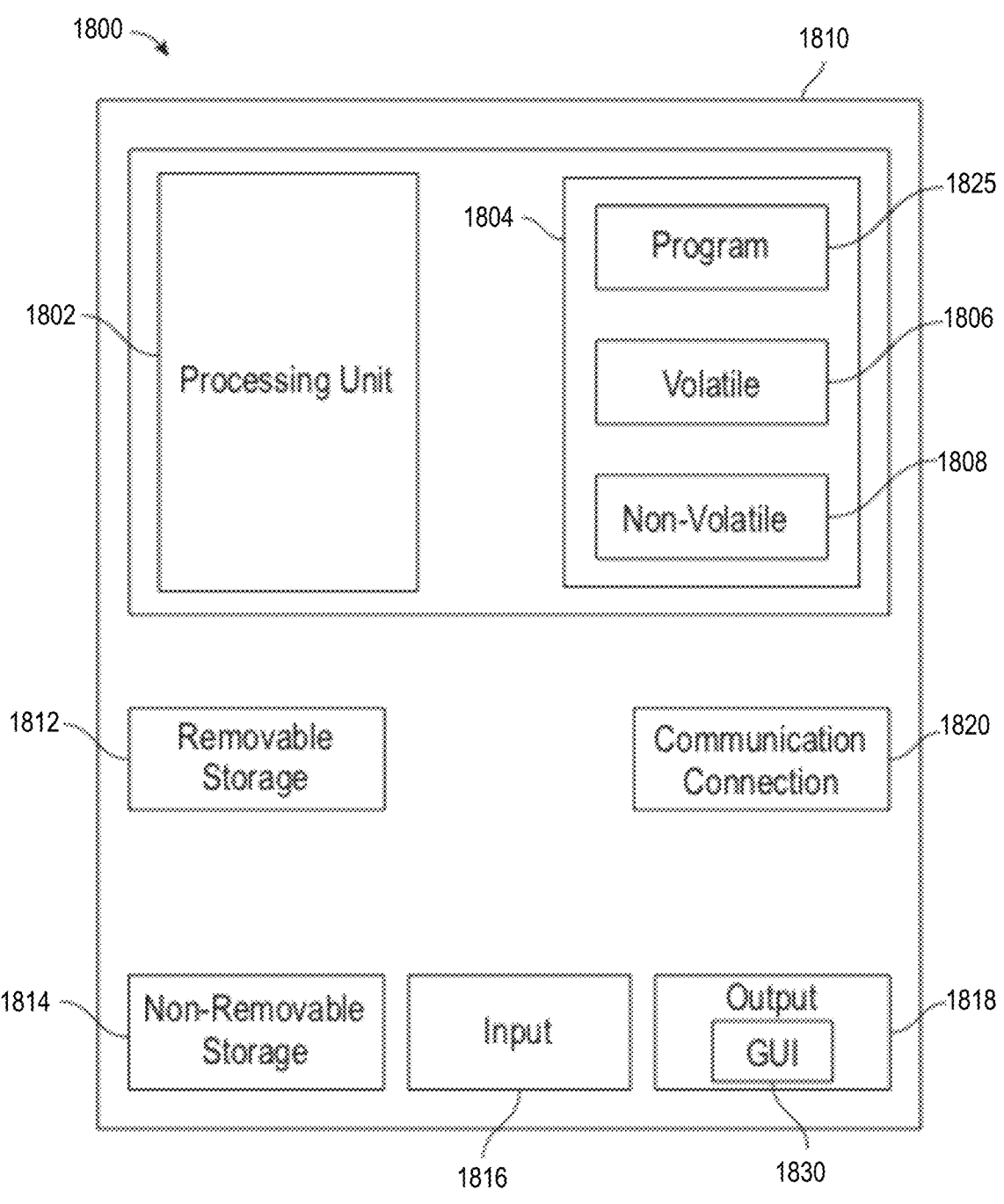
FIG. 18 depicts a block diagram of a computer system which is implemented in accordance with the disclosed embodiments.
Figure 19:
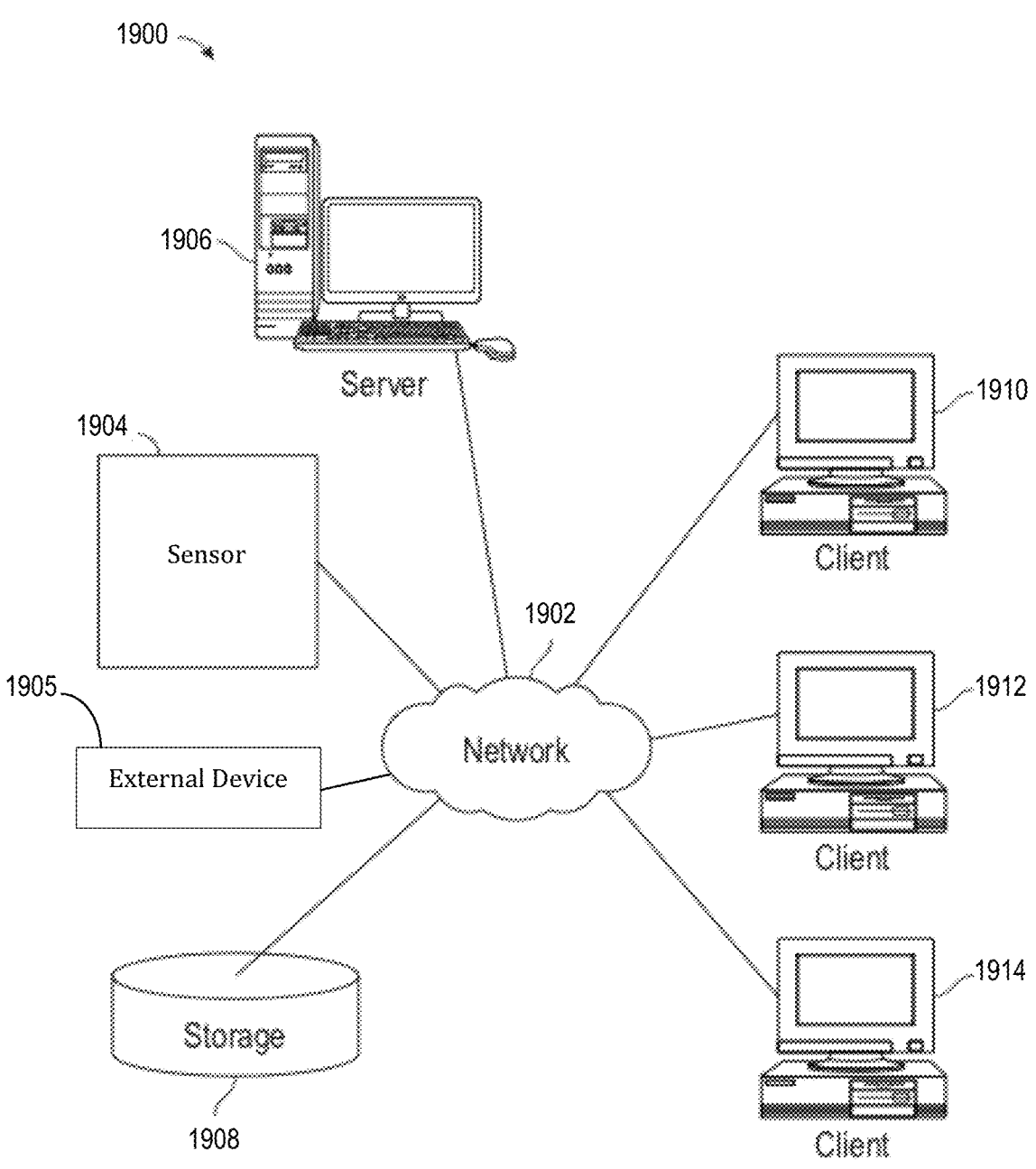
FIG. 19 depicts a graphical representation of a network of data-processing devices in which aspects of the present embodiments may be implemented.
Figure 20:
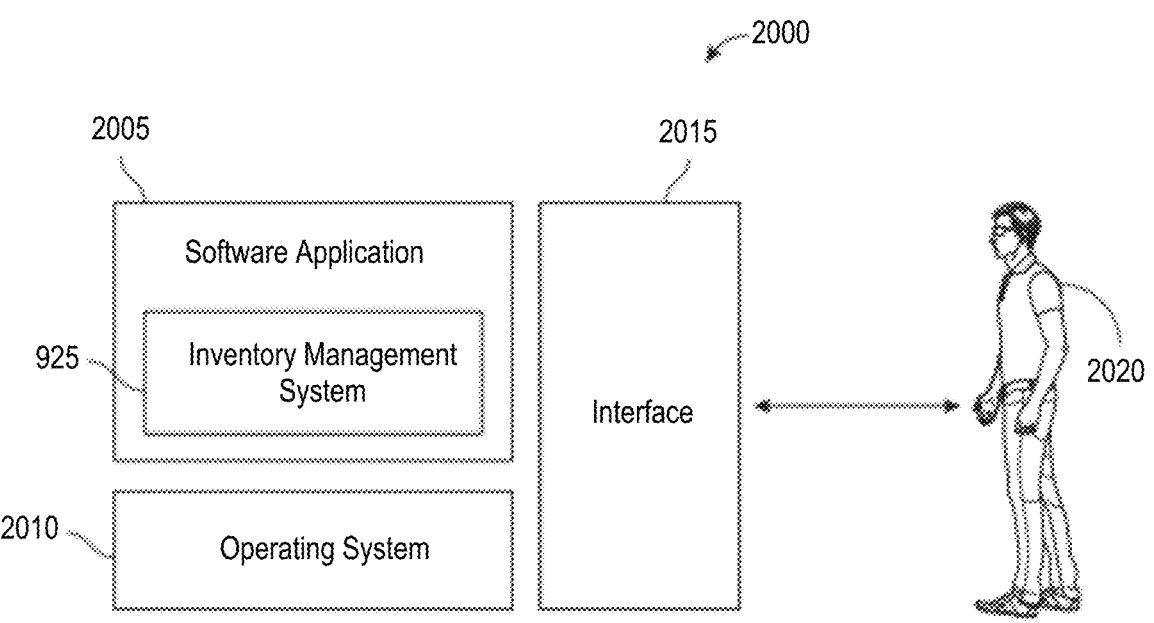
FIG. 20 depicts a computer software system for directing the operation of the data-processing system depicted in FIG. 18, in accordance with an example embodiment.

FIGS. 18-20 are provided as exemplary diagrams of data-processing environments in which embodiments of the present invention may be implemented. It should be appreciated that FIGS. 18-20 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 1800 that executes programming for implementing parts of the methods and systems disclosed herein is shown in FIG. 18. A computing device in the form of a computer 1810 configured to interface with sensors, peripheral devices, and other elements disclosed herein may include one or more processing units 1802, memory 1804, removable storage 1812, and non-removable storage 1814. Memory 1804 may include volatile memory 1806 and non-volatile memory 1808. Computer 1810 may include or have access to a computing environment that includes a variety of transitory and non-transitory computer-readable media such as volatile memory 1806 and non-volatile memory 1808, removable storage 1812 and non-removable storage 1814. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 1810 may include or have access to a computing environment that includes input 1816, output 1818, and a communication connection 1820. The computer may operate in a networked environment using a communication connection 1820 to connect to one or more remote computers, remote sensors, detection devices, hand-held devices, multi-function devices (MFDs), mobile devices, tablet devices, mobile phones, Smartphones, or other such devices. The remote computer may also include a personal computer (PC), server, router, network PC, RFID enabled device, a peer device or other common network node, or the like. The communication connection may include a Local Area Network (LAN), a Wide Area Network (WAN), Bluetooth connection, or other networks. This functionality is described more fully in the description associated with FIG. 19 below.

Output 1818 is most commonly provided as a computer monitor, but may include any output device. Output 1818 and/or input 1816 may include a data collection apparatus associated with computer system 1800. In addition, input 1816, which commonly includes a computer keyboard and/or pointing device such as a computer mouse, computer track pad, or the like, allows a user to select and instruct computer system 1800. A user interface can be provided using output 1818 and input 1816. Output 1818 may function as a display for displaying data and information for a user, and for interactively displaying a graphical user interface (GUI) 1830.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 1816 such as, for example, a pointing device such as a mouse and/or with a keyboard. A particular item can function in the same manner to the user in all applications because the GUI provides standard software routines (e.g., module 1825) to handle these elements and report the user's actions. The GUI can further be used to display the electronic service image frames as discussed below.

Computer-readable instructions, for example, program module or node 1825, which can be representative of other modules or nodes described herein, are stored on a computer-readable medium and are executable by the processing unit 1802 of computer 1810. Program module or node 1825 may include a computer application. A hard drive, CD-ROM, RAM, Flash Memory, and a USB drive are just some examples of articles including a computer-readable medium.

FIG. 19 depicts a graphical representation of a network of data-processing systems 1900 in which aspects of the present invention may be implemented. Network data-processing system 1900 is a network of computers or other such devices such as mobile phones, smartphones, sensors, detection devices, and the like in which embodiments of the present invention may be implemented. Note that the system 1900 can be implemented in the context of a software module such as program module 1825. The system 1900 includes a network 1902 in communication with one or more clients 1910, 1912, and 1914, and external device 1905. Network 1902 may also be in communication with one or more RFID enabled devices or sensors 1904, servers 1906, and storage 1908. Network 1902 is a medium that can be used to provide communications links between various devices and computers connected together within a networked data processing system such as computer system 1800. Network 1902 may include connections such as wired communication links, wireless communication links of various types, fiber optic cables, quantum, or quantum encryption, or quantum teleportation networks, etc. Network 1902 can communicate with one or more servers 1906, one or more external devices such as RFID enabled device 1904, and a memory storage unit such as, for example, memory or database 1908. It should be understood that RFID enabled device 1904 may be embodied as a mobile device, cell phone, tablet device, monitoring device, detector device, sensor microcontroller, controller, receiver, transceiver, or other such device.

In the depicted example, RFID enabled device 1904, server 1906, and clients 1910, 1912, and 1914 connect to network 1902 along with storage unit 1908. Clients 1910, 1912, and 1914 may be, for example, personal computers or network computers, handheld devices, mobile devices, tablet devices, smartphones, personal digital assistants, microcontrollers, recording devices, MFDs, etc. Computer system 1800 depicted in FIG. 18 can be, for example, a client such as client 1910 and/or 1912.

Computer system 1800 can also be implemented as a server such as server 1906, depending upon design considerations. In the depicted example, server 1906 provides data such as boot files, operating system images, applications, and application updates to clients 1910, 1912, and/or 1914. Clients 1910, 1912, and 1914 and RFID enabled device 1904 are clients to server 1906 in this example. Network data-processing system 1900 may include additional servers, clients, and other devices not shown. Specifically, clients may connect to any member of a network of servers, which provide equivalent content.

In the depicted example, network data-processing system 1900 is the Internet with network 1902 representing a worldwide collection of networks and gateways that use the Transmission Control Protocol/Internet Protocol (TCP/IP)

suite of protocols to communicate with one another. At the heart of the Internet is a backbone of high-speed data communication lines between major nodes or host computers consisting of thousands of commercial, government, educational, and other computer systems that route data and messages. Of course, network data-processing system 1900 may also be implemented as a number of different types of networks such as, for example, an intranet, a local area network (LAN), or a wide area network (WAN). FIGS. 18 and 19 are intended as examples and not as architectural limitations for different embodiments of the present invention.

FIG. 20 illustrates a software system 2000, which may be employed for directing the operation of the data-processing systems such as computer system 1800 depicted in FIG. 18. Software application 2005, may be stored in memory 1804, on removable storage 1812, or on non-removable storage 1814 shown in FIG. 18, and generally includes and/or is associated with a kernel or operating system 2010 and a shell or interface 2015. One or more application programs, such as module(s) or node(s) 1825, may be "loaded" (i.e., transferred from removable storage 1814 into the memory 1804) for execution by the data-processing system 1800. The data-processing system 1800 can receive user commands and data through user interface 2015, which can include input 1816 and output 1818, accessible by a user 2020. These inputs may then be acted upon by the computer system 1800 in accordance with instructions from operating system 2010 and/or software application 2005 and any inventory management system 925 thereof.

Generally, program modules (e.g., module 1825) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smart phones, tablet devices, multi-processor systems, printers, copiers, fax machines, multi-function devices, data networks, microprocessor-based or programmable consumer electronics, networked personal computers, minicomputers, mainframe computers, servers, humidors, and the like.

Note that the term module or node as utilized herein may refer to a collection of routines and data structures that perform a particular task or implements a particular abstract data type. Modules may be composed of two parts: an interface, which lists the constants, data types, variables, and routines that can be accessed by other modules or routines; and an implementation, which is typically private (accessible only to that module), and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 2015 (e.g., a graphical user interface 1830) can serve to display results, whereupon a user 2020 may supply additional inputs or terminate a particular session. In some embodiments, operating system 2010 and GUI 1830 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 2010 and interface 2015. The software application 2005 can include, for example, module(s) 1825, which can include instructions for carrying out steps or logical operations such as those shown and described herein.

The following description is presented with respect to embodiments of the present invention, which can be embodied in the context of, or require the use of a data-processing system such as computer system 1800, in conjunction with program module 1825, and data-processing system 1900 and network 1902 depicted in FIGS. 18-20. The present invention, however, is not limited to any particular application or any particular environment. Instead, those skilled in the art will find that the systems and methods of the present invention may be advantageously applied to a variety of system and application software including database management systems, word processors, and the like. Moreover, the present invention may be embodied on a variety of different platforms including Windows, Macintosh, UNIX, LINUX, Android, Arduino and the like. Therefore, the descriptions of the exemplary embodiments, which follow, are for purposes of illustration and not considered a limitation.

Figure 21:
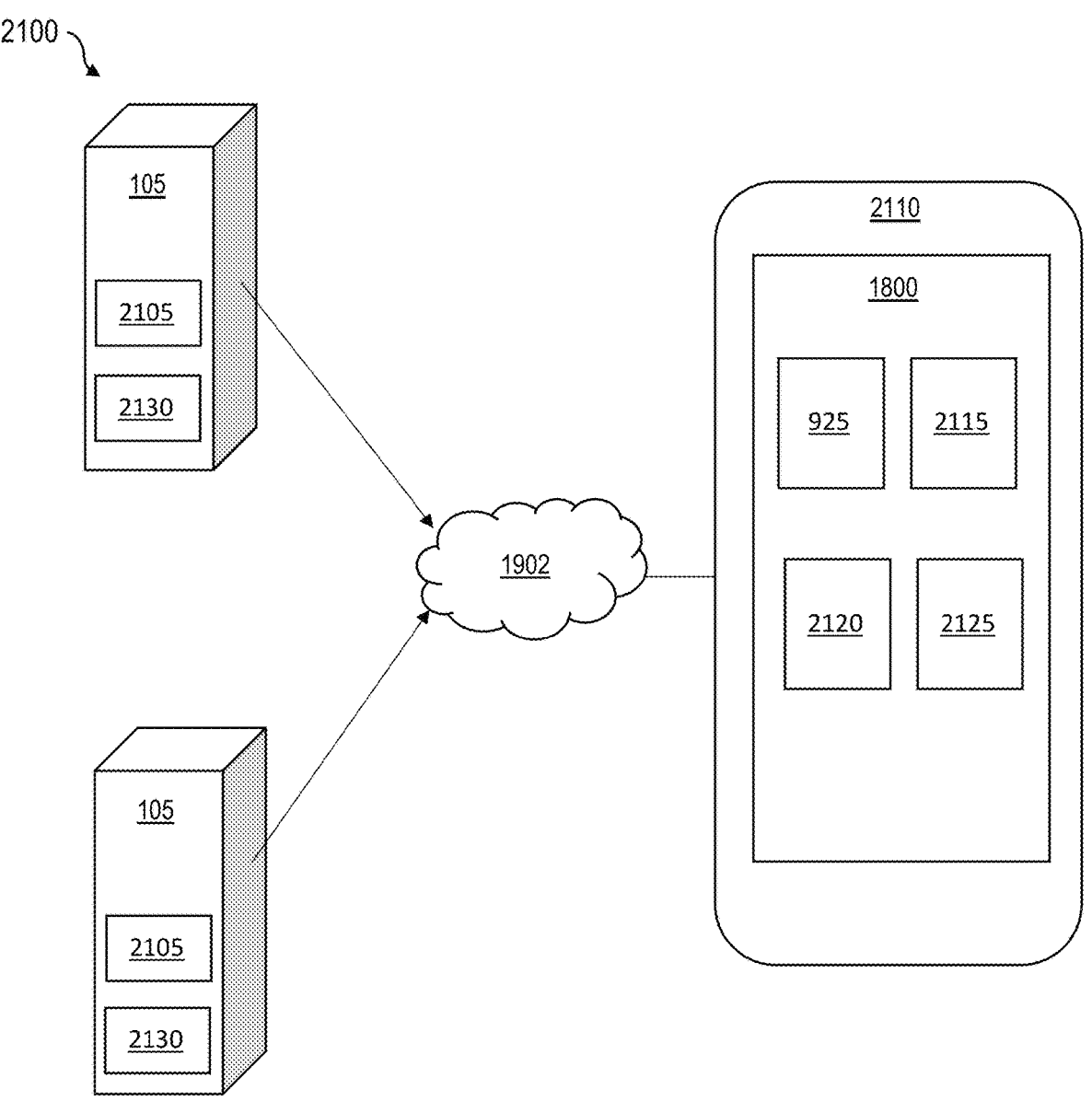
FIG. 21 depicts a block diagram of aspects of a product display and inventory management system, in accordance with the disclosed embodiments.

FIG. 21 illustrates a block diagram of a product display and inventory management system 2100 in accordance with the disclosed embodiments. In general, one or more humidors 105, with features as disclosed in other embodiments, can be disposed in a retail sales environment. The humidors 105 can include a selection of sensors 2105, including but not limited to humidity sensors, thermometers, cameras 905 comprising still or video cameras, as well as RFID sensors 915, and smart locks 910. The sensors can be used to remotely monitor the temperature and humidity in the humidor. In certain embodiments, the sensor 2105 can further include a reader/sensor connected to a float in a humidifier in order to read the water level in each humidor.

In certain embodiments a diagnostics box 2130 can be configured in the humidor 105 and can be configured to accept input from sensor 2105, as well as other components associated with the humidor. The diagnostics box 2130 can monitor the humidor operational status and report status for components such as fans, compressors, thermometers, sensor failures, power failures, door ajar etc., to the IOT hub 2110.

Data from these sensors 2105 can be transmitted via network 1902 to an internet of things (IOT) hub 2110. The IOT hub 2110 can comprise a computer system 1800 which can include a database 2115 to store data regarding product 115 inventory in one or more of the humidors 105. The computer system 1800 can include inventory management module 925. The IOT hub 2110 can further include an event manager 2120, which can provide notifications as inventory shifts. Likewise, a data visualization module 2125 can be used to create various visual representations of inventory. This can include electronic renderings of a specific humidor 105, with vacancies in various channels in the humidor 105. The IOT hub 2110 can thus be used to provide inventory information to a cigar distributor or wholesaler.

The product display and inventory management system 2100 enables a wholesale and/or retail product seller to track cigar product inventory in real time. This can increase productivity and reduce the probability of human errors. The product display and inventory management system 2100 can provide constant visibility into quantity of cigars, type of cigars, location and purchasing data around products to identify popular cigars and purchasing trends. This data can be used to plan the inventory needs of retail sellers. With real-time data, the product display and inventory management system 2100 can enable inventory managers to lower the amount of cigar inventory on hand while meeting the needs of the retail store outlets. Likewise, the visualization module can be used to illustrate bottle necks in the inventory operations based on the cigar stock and the count of cigars in a manufacturing facility. With real-time cigar data, product wholesalers can supply inventory to their retail store customers ahead of time and provide a better customer experience.

Figure 22:
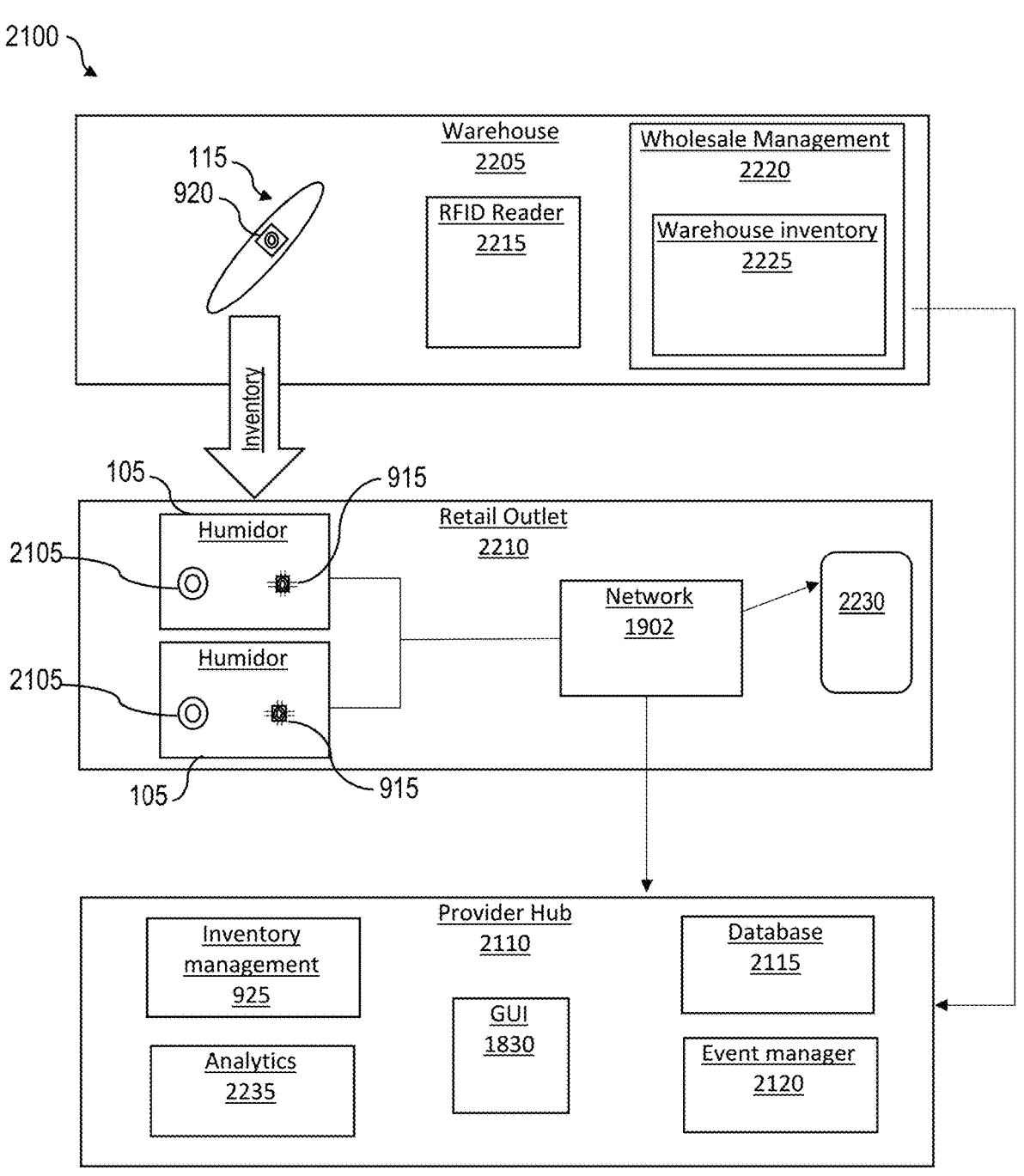
FIG. 22 depicts a block diagram of a product display and inventory management system, in accordance with the disclosed embodiments.

FIG. 22 illustrates a block diagram of a product display and inventory management system 2100 in accordance with the disclosed embodiments. The system 2100 can include a warehouse 2205 in which various products 115 can be fitted with RFID tags 920 and stored for distribution to retail outlets 2210. The system further includes a IOT hub 2110.

In the warehouse 2205, tobacco products 115 can be tagged with an RFID tag 920 and can be scanned with a warehouse RFID reader 2215. Data from the RFID reader 2215 can be provided to a warehouse management system 2220, which can track warehouse inventory with a warehouse inventory module 2225. The warehouse inventory module can comprise a software platform used to track warehouse inventory and control inventory distribution as disclosed herein.

At the retail outlet 2210, one or more humidors 105 comprising aspects of the humidor display systems disclosed herein can be disposed. The humidors 105 can include an RFID foot pad circuit board 1005, RFID detectors 915, cameras 905, smart locks 910, humidity sensors, thermometers or other such sensors as disclosed herein. As RFID tagged cigar products are inserted in the humidor 105, the presence of the products 115 can be tracked with the camera system and RFID readers. Likewise, when a product is removed for sale, the removal can be identified. In certain embodiments, data from the sensors and RFID readers can be provided to a retail device 2230, and can be transmitted to an IOT hub 2110.

The retail device 2230 can comprise a computer system 1800 embodied as a computer, tablet computer, smart phone, or the like. The retail device 2230 can display inventory data including number, type, brand, style, etc. of tobacco products, along with temperature of the humidor 105, humidity of the humidor 105, and humidor access data provided by smart lock 910 on the humidor. The retail device 2230 can, in certain embodiments, allow the retail operator to adjust humidor 105 humidity and temperature levels, and to order additional product 115, if necessary, from the distributor.

The provider hub 2110 can serve as system for tracking and data analytics for the tobacco distributor. The provider hub can receive product data from multiple retail outlets 2210 and associated humidors 105 therein. The IOT hub 2110 can comprise a computer system 1800 which can include a database 2115 to store data regarding product 115 inventory in one or more of the humidors 105, as well as inventory data from the warehouse 2205. The computer system 1800 can include inventory management module 925. The IOT hub can further include an event manager 2120, which can provide notifications as inventory shifts. Likewise, a data visualization module 2125 can be used to create various visual representations of inventory. The IOT hub 2110 can thus be used to provide inventory information to a cigar distributor or wholesaler. It should be appreciated that in certain embodiment the IOT hub can include a standalone interface. In other embodiments, the IOT hub can interface with a user module on a user device to provide data to the user via the user device.

The provider hub can further include an analytics module 2235. The analytics module 2235 can track inventory levels in humidors 105 and in the warehouse 2205. The analytics module can use this data to determine which products 115 are popular, in which geographic region certain products 115 are popular, where products 115 are required to be transported to retail outlets 2210, what additional stock is required in the warehouse 2205, operational status and conditions of humidors 105, and other such data. When a specific humidor 105 requires additional stock of a specific product line, the analytics module can notify the event manager 2120, which can issue an SMS message, text message, email, or other such notification to the distributor.

The embodiments disclosed herein can thus provide improved solutions for displaying tobacco products. The disclosed embodiments allow customers to easily browse a selection of cigars and choose those they would like to purchase, while providing the necessary conditions (e.g., temperature, humidity, aroma, etc.) to maintain the quality of the tobacco products.

Figure 23:
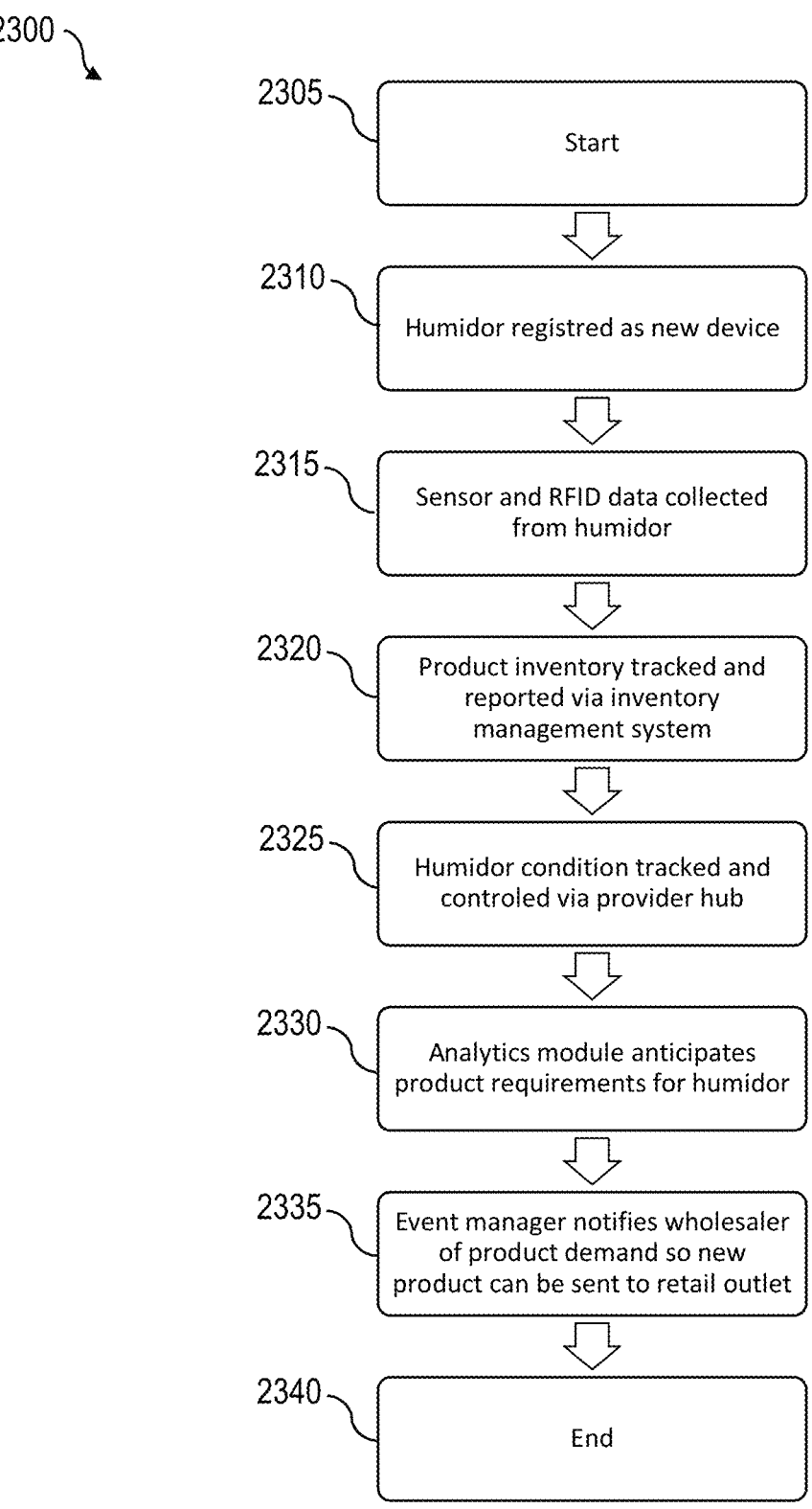
FIG. 23 depicts operational steps in a method for tobacco product inventory management and display, in accordance with the disclosed embodiments.

In an exemplary embodiment, the systems illustrated in FIGS. 18-22 can operate as illustrated in FIG. 23. FIG. 23 illustrates a method 2300 for managing tobacco product inventory in accordance with the disclosed embodiments. The method begins as 2305.

At step 2310 a humidor can be registered with the product display and inventory management system 2100. This can include location data, the retail store where the humidor is located, retailer information, and basic humidor condition initialization metrics. Once the humidor is registered, it can be stocked with product, at which point RFID and sensor data can be collected as illustrated at step 2315.

At step 2320, inventory data for the humidor, along with all other registered humidors can be collected. The inventory management system can track product supply in each of the humidors and provide supply data to the wholesaler or product distributor. Likewise, at step 2325, humidor conditions can be remotely monitored to ensure products therein remain fresh and marketable.

At step 2330, the analytics module can use product supply data and access data to determine current supply requirements, and to anticipate future product demand so that sufficient product supply can be transported to the humidor accordingly. The event manager can notify the wholesaler or product distributor of data from the analytics module at step 2335 so that the product distributor can distribute product distribution as necessary. The method ends at 2340.

The disclosed embodiments, make it much easier to view the cigar ring making it easy to identify the cigar. In addition, the embodiments do not require the customer to touch more than one of the cigars, thereby preventing the spread of disease. The disclosed displays further provide aesthetics that encourage a customer to purchase a cigar.

Furthermore, the disclosed embodiments make it easy for the store owner to track inventory. The product display is set to hold a given number of products, and the shop owner can easily verify how many products have been removed from the display. This allows the shop owner to cross check sales against products in the display to ensure products are not being stolen. The disclosed embodiments thus address a major challenge presented by traditional cigar display systems.

Based on the foregoing, it can be appreciated that a number of embodiments, preferred and alternative, are disclosed herein. For example, in an embodiment a product display system comprises a base, a frame formed around the base, and at least one display bar configured to sit on the base and inside the frame formed around the base, the display bar further comprising at least one tubular channel, the tubular channel being configured to hold a product for display.

In an embodiment, the at least one tubular channel comprises a plurality of tubular channels formed in a row on each of the plurality of display bars. In an embodiment, a depth of each of the plurality of tubular channels decreases sequentially from a front tubular channel among the plurality of tubular channels to a back tubular channel among the plurality of tubular channels. In an embodiment, the at least one display bar comprises a plurality of display bars, wherein the base and the frame are sized to house the plurality of display bars. In an embodiment, the plurality of display bars are arranged in the frame formed around the base such that the plurality of tubular channels form a grid of tubular channels. In an embodiment, the base further comprises a plurality of slats. In an embodiment, the at least one tubular channel is configured to have a diameter sized to fit a tobacco product.

In an embodiment, the product display system further comprises a humidor wherein the base, the frame formed around the base, and the at least one display bar are housed in the humidor. In an embodiment, the frame further comprises a first side rail, the first side rail having a first connecting arm mounted thereon, the first connecting arm configured to interface with a first mounting rail mounted in the humidor and a second side rail, the second side rail having a second connecting arm mounted thereon, the second connecting arm configured to interface with a second mounting rail mounted in the humidor.

In another embodiment, a product display system comprises a humidor, and an extendable display tray mounted in the humidor, the extendable display tray further comprising a base, a frame formed around the base, and a plurality of display bars arranged inside the frame formed around the base, each of the plurality of display bars comprising a row of tubular channels, each of the tubular channels being configured to hold a cigar vertically.

In an embodiment, the product display system further comprises a first connecting arm mounted to a side of the frame, the first connecting arm configured to interface with a first mounting rail mounted in the humidor and a second connecting arm mounted to an opposing side of the frame, the second connecting arm configured to interface with a second mounting rail mounted in the humidor.

In an embodiment, a depth of each of the plurality of tubular channels decreases sequentially from a front tubular channel among the plurality of tubular channels to a back tubular channel among the plurality of tubular channels.

In an embodiment, the base, the frame formed around the base, and the plurality of display bars arranged inside the frame formed around the base are made of wood. In an embodiment, a diameter of the tubular channels in each of the mounting blocks is different.

In yet another embodiment, a product display system comprises an enclosure and at least one product tray inside the enclosure, the product tray comprising a base, a frame formed around the base, and at least one top sheet extending between two edges of the frame, the at least one top sheet having at least one product stand hole formed therein. In an embodiment, the enclosure is transparent.

In an embodiment, the product display system further comprises a humidifier disposed in the enclosure.

In an embodiment, the at least one top sheet extending between two edges of the frame, comprises a plurality of top sheets each of the plurality of top sheets extending between the two edges of the frame.

In an embodiment, the product display system of further comprises at least two shelves formed inside the enclosure. In an embodiment, each of the at least two shelves houses one of the at least one product trays.

It will be appreciated that variations of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A product display system comprising:
an extendable display tray comprising:
    a series of slats forming a base of the extendable display tray;
    a frame comprising two side rails, a front, and a rear of the extendable display tray;
    a first connecting arm installed on one of the two side rails, the first connecting arm configured to engage a first mounting rail;
    a second connecting arm installed on another of the two side rails, the second connecting arm configured to engage a second mounting rail;
a plurality of loaded spring channel assemblies, each of the plurality of loaded spring channel assemblies being configured to be disposed in the extendable display tray such that each of the plurality of loaded spring channel assemblies rests on the slats forming the base of the extendable display tray, where each of the plurality of loaded spring channel assemblies comprises:
    a product channel sized to fit in the extendable display tray;
    a spring mounted to a spring mount wall; and
    a product dispensing platform attached to the spring;
wherein the at least one loaded spring channel is configured to hold a product for display.

2. The product display system of claim 1 wherein the at least one loaded spring channel further comprises:
two vertical walls spaced such that the product can stand vertically in between the two vertical walls.

3. The product display system of claim 1 wherein the loaded spring channel assemblies each comprise a separate front facing end of the product channel configured to fit inside the front of the extendable display tray.

4. The product display system of claim 3 wherein each product dispensing platform further comprises:
a vertical brace configured to push products toward the front facing end of the product channel.

5. The product display system of claim 3 wherein each loaded spring channel assembly further comprises:
a brace configured at a front facing end of the product channel.

6. The product display system of claim 5 wherein each brace further comprises:
plexiglass.

7. The product display system of claim 1 further comprising:
a humidor configured with a first mounting rail configured to engage the first connecting arm installed on one of the two side rails, and a second mounting rail configured to engage the second connecting arm installed on another of the two side rails, wherein the extendable display tray and the plurality of loaded spring channel assemblies are housed in the humidor.

8. The product display system of claim 1 wherein the product channel is sized to fit a tobacco product.

9. A product display system comprising:

an enclosure;

at least one extendable display tray inside the enclosure, the at least one extendable display tray comprising:

a series of slats forming a base of the extendable display tray;

a frame comprising two side rails, a front, and a rear of the extendable display tray;

a first connecting arm installed on one of the two side rails, the first connecting arm configured to engage a first mounting rail in the enclosure;

a second connecting arm installed on another of the two side rails, the second connecting arm configured to engage a second mounting rail in the enclosure; and at least one loaded spring channel assembly wherein each of the at least one loaded spring channel assemblies rests on the slats forming the base of the extendable display tray, each of the at least one loaded spring channel assemblies comprising,:

a product channel;

a spring mounted to a spring mount wall; and a product dispensing platform attached to the spring;

wherein the at least one loaded spring channel is configured to hold a product for display in the extendable display tray in the enclosure.

10. The product display system of claim 9 wherein the at least one loaded spring channel further comprises:

two vertical walls spaced such that the product can stand vertically in between the two vertical walls; and a brace configured at a front facing end of the product channel.

11. The product display system of claim 10 wherein the brace further comprises:

plexiglass.

12. The product display system of claim 9 wherein the at least one loaded spring channel assembly comprises a plurality of loaded spring channel assemblies, disposed in the at least one extendable display tray.

13. The product display system of claim 9 wherein the product channel is sized to fit a tobacco product.

\* \* \* \* \*